(12) United States Patent
Robson

(10) Patent No.: US 9,790,962 B2
(45) Date of Patent: Oct. 17, 2017

(54) ACCUMULATOR

(71) Applicant: Angus Peter Robson, Matamata (NZ)

(72) Inventor: Angus Peter Robson, Matamata (NZ)

( * ) Notice: Subject to any disclaimer, the term of this patent is extended or adjusted under 35 U.S.C. 154(b) by 604 days.

(21) Appl. No.: 14/350,845

(22) PCT Filed: Oct. 10, 2012

(86) PCT No.: PCT/IB2012/055464
§ 371 (c)(1),
(2) Date: Apr. 10, 2014

(87) PCT Pub. No.: WO2013/054262
PCT Pub. Date: Apr. 18, 2013

(65) Prior Publication Data
US 2014/0290972 A1 Oct. 2, 2014

(30) Foreign Application Priority Data
Oct. 10, 2011 (NZ) ........................ 595683

(51) Int. Cl.
*F15B 1/24* (2006.01)
*E02D 7/10* (2006.01)
(Continued)

(52) U.S. Cl.
CPC ............. *F15B 1/24* (2013.01); *B25D 9/145* (2013.01); *B30B 9/3057* (2013.01); *B30B 15/163* (2013.01); *E02D 7/10* (2013.01); *E02D 7/14* (2013.01); *E02F 3/966* (2013.01); *E02F 5/323* (2013.01); *F15B 1/024* (2013.01);
(Continued)

(58) Field of Classification Search
CPC ...... E21B 33/06; E21B 33/063; E21B 33/064; E21B 33/0355; E21B 34/16; E02D 7/08; E02D 7/10; F15B 1/24; F15B 1/08; F15B 1/024; F15B 1/022; F15B 1/027; F15B 3/00; F15B 15/12; F15B 21/006; F15B 21/08; F15B 2201/32; F15B 2201/312; F15B 2201/205
USPC ......... 173/1, 90, 91, 206, 207, 208, 128, 89, 173/124, 152, 135, 138; 60/398, 412, 60/413, 410, 416; 166/361, 373; 138/26, 138/31
See application file for complete search history.

(56) References Cited
U.S. PATENT DOCUMENTS 4,667,473 A 5/1987 Robinson
5,971,027 A 10/1999 Beachley et al.
(Continued)

FOREIGN PATENT DOCUMENTS

DE 3139600 4/1983
DE 3930553 3/1991
(Continued)

*Primary Examiner* — Scott A. Smith
(74) *Attorney, Agent, or Firm* — Stephen M. De Klerk

(57) ABSTRACT

A hydraulic accumulator including an energy storage apparatus with a first piston face configured to reversibly compress an energy storage medium and a second piston face forming at least part of an inner surface of a corresponding second fluid chamber reversibly expandable by movement of the second piston face. A third piston face forms at least part of an inner surface of a corresponding third fluid chamber reversibly expandable by the third piston face. The first, second and third piston faces are coupled together.

26 Claims, 14 Drawing Sheets

(51) Int. Cl.
  *E02D 7/14* (2006.01)
  *B25D 9/14* (2006.01)
  *E02F 3/96* (2006.01)
  *F15B 1/02* (2006.01)
  *B30B 9/30* (2006.01)
  *B30B 15/16* (2006.01)
  *E02F 5/32* (2006.01)
  *E21B 33/035* (2006.01)
  *F15B 1/027* (2006.01)

(52) U.S. Cl.
  CPC .... *B25D 2209/002* (2013.01); *E21B 33/0355* (2013.01); *F15B 1/027* (2013.01); *F15B 2201/205* (2013.01); *F15B 2201/21* (2013.01); *F15B 2201/31* (2013.01); *F15B 2201/32* (2013.01); *Y02E 60/15* (2013.01)

(56) References Cited

U.S. PATENT DOCUMENTS

| | | | |
|---|---|---|---|
| 6,266,959 B1 | 7/2001 | Markwart | |
| 6,418,970 B1 * | 7/2002 | Deul | E21B 33/064 138/26 |
| 6,863,507 B1 * | 3/2005 | Schaeffer | F01B 11/007 123/46 R |
| 7,107,766 B2 * | 9/2006 | Zacche' | A23L 3/0155 60/413 |
| 7,331,405 B2 * | 2/2008 | Robson | B28D 1/26 173/124 |
| 7,407,017 B2 * | 8/2008 | Robson | B28D 1/26 173/1 |
| 7,520,129 B2 * | 4/2009 | Springett | E21B 33/0355 60/398 |
| 7,832,207 B2 * | 11/2010 | McBride | F15B 1/024 60/410 |
| 8,037,678 B2 * | 10/2011 | McBride | F15B 1/024 60/412 |
| 8,046,990 B2 * | 11/2011 | Bollinger | H02J 15/006 60/410 |
| 8,418,451 B2 * | 4/2013 | Stanger | E02F 9/2217 60/372 |
| 8,479,774 B2 * | 7/2013 | Baugh | E21B 34/16 138/26 |
| 8,602,109 B2 * | 12/2013 | Gustafson | E21B 33/0355 166/361 |
| 8,661,812 B2 * | 3/2014 | Ganzel | B60T 7/042 303/114.1 |
| 2004/0118623 A1 | 6/2004 | Shore et al. | |
| 2009/0025379 A1 | 1/2009 | White | |
| 2012/0192553 A1 | 8/2012 | Scheffel | |
| 2012/0260643 A1 | 10/2012 | Kadlicko et al. | |
| 2013/0098023 A1 | 4/2013 | Yoshino | |
| 2013/0133853 A1 | 5/2013 | Stroganov et al. | |
| 2013/0199168 A1 | 8/2013 | Ankargren et al. | |

FOREIGN PATENT DOCUMENTS

| | | |
|---|---|---|
| DE | 19633055 | 2/1998 |
| DE | 102008048054 A1 | 3/2010 |
| DE | 102011106715 A1 | 1/2013 |
| DE | 102011108253 A1 | 1/2013 |
| DE | 102012104251 A1 | 11/2013 |
| EP | 0356780 A2 | 8/1989 |
| FR | 2701468 | 8/1994 |
| JP | 2004-28212 | 1/2004 |
| WO | 02/43980 A2 | 6/2002 |
| WO | 2011/116914 | 9/2011 |
| WO | 2013/079151 | 6/2013 |
| WO | 2013/079222 | 6/2013 |
| WO | 2013/164072 | 11/2013 |
| WO | 2013/164073 | 11/2013 |
| WO | 2013/164096 | 11/2013 |

* cited by examiner

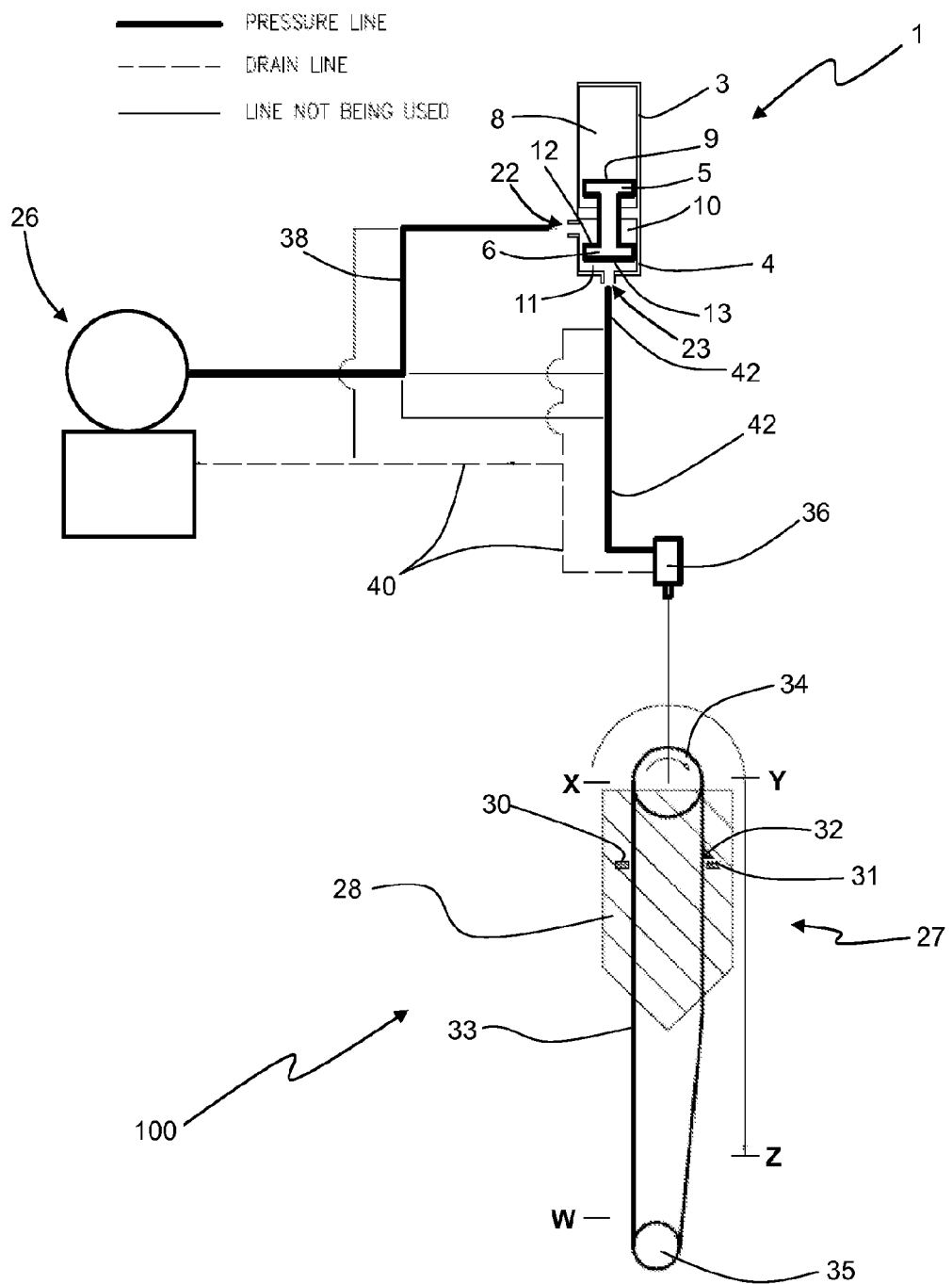

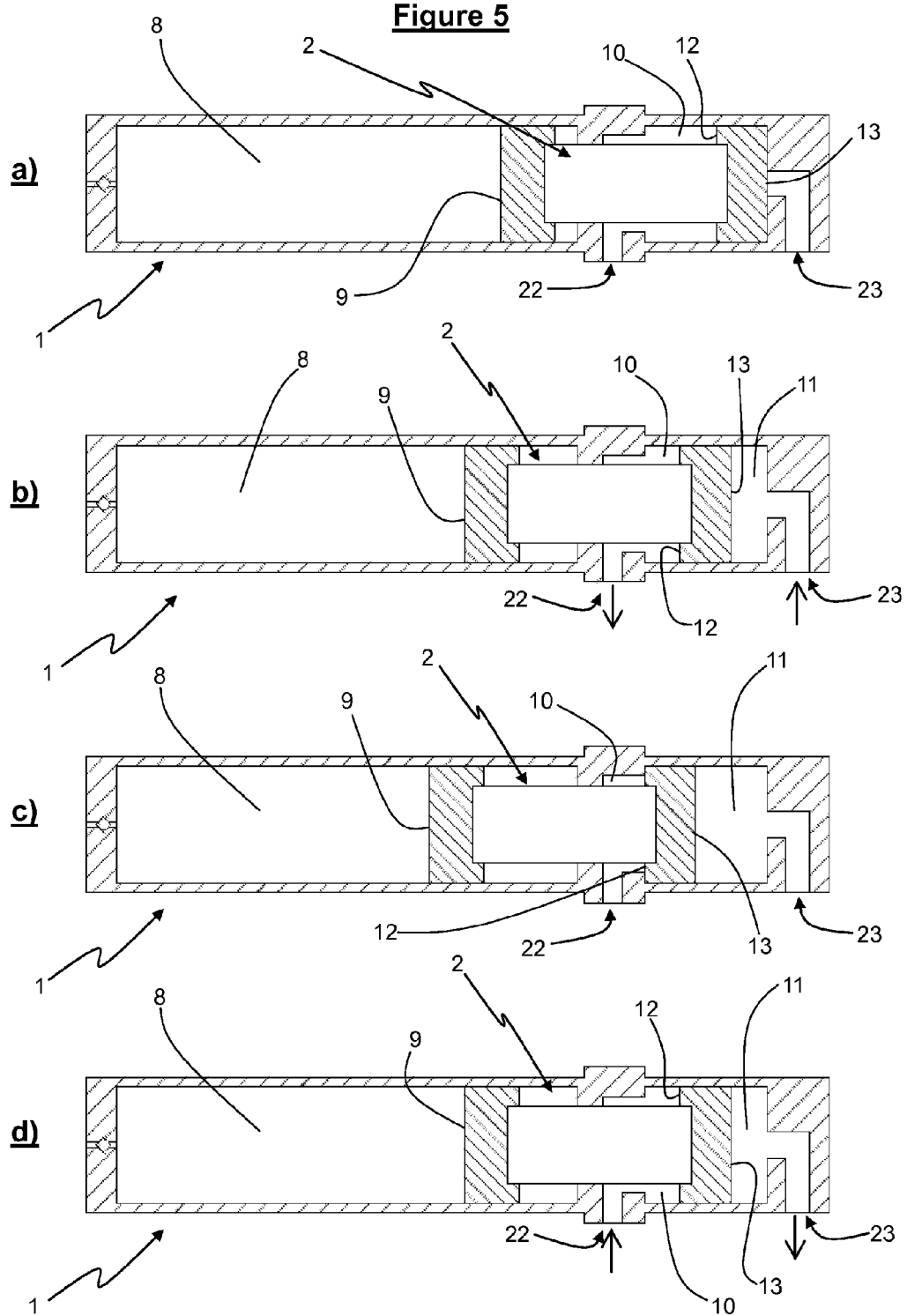

ACCUMULATOR

CROSS-REFERENCE TO OTHER APPLICATIONS

This is a National Phase of International Application No. PCT/IB2012/055464, filed on Oct. 10, 2012, which claims priority from New Zealand Patent Application No. 595683, filed on Oct. 10, 2011.

TECHNICAL FIELD

The present invention relates to an accumulator for use in machinery and devices executing cyclic or reciprocating actions, and in particular, hydraulic, pneumatic and equivalent or related accumulators.

BACKGROUND ART

Accumulators are well known apparatus used in a variety of engineering fields as a means by which energy can be stored and are sometimes used to convert a small continuous power source into a short surge of energy or vice versa. Accumulators may be electrical, fluidic or mechanical and may take the form of a rechargeable battery or a hydraulic accumulator, capacitor, compulsator, steam accumulator, wave energy machine, pumped-storage hydroelectric plant or the like.

Hydraulic accumulators are produced in numerous forms including piston accumulators, bladder accumulators, diaphragm accumulators, weighted and spring-loaded accumulators. One of the primary tasks of hydraulic accumulators is to hold specific volumes of pressurized fluids of a hydraulic system and to return them to the system on demand. However, hydraulic accumulators may also be configured to perform a plurality of tasks including, energy storage, impact, vibration and pulsation damping, energy recovery, volumetric flow compensation, and the like.

There are inherent restrictions in any hydraulic system powered by a pump configured to provide a predetermined continuous power. While a more powerful pump will have the capacity to pump hydraulic fluid faster at a given pressure, it also requires more energy. A hydraulic accumulator normally allows the system to accommodate a rapid surge in internal pressure via its storage of pressurized hydraulic fluid, avoiding damage to the system.

Typical hydraulic accumulators are storage chambers into which hydraulic fluid is pumped by a hydraulic pump, often to relieve excess pressure elsewhere in the hydraulic circuit. The accumulator may include a further valve through which the stored fluid outputs into the rest of the hydraulic system. In gas accumulators, a pressurized gas bladder presses against a hydraulic bladder. As the hydraulic bladder fills, it compresses the gas in the gas bladder, thus increasing the stored pressure. A spring accumulator operates in a similar manner, with the exception of a large spring or springs applying the compressive force against the hydraulic bladder. In a raised weight accumulator, the hydraulic fluid is pumped into a weighted piston. Thus gravity exerts a constant force on the fluid, compressing it as it fills the piston and assisting emptying of the piston.

Typical prior art gas accumulators consist of a fluid chamber connected to a hydraulic system and a pre-charged gas chamber. The chambers are separated by a bladder, piston, or any kind of elastic diaphragm.

If the fluid pressure at the inlet to the accumulator fluid chamber becomes higher than the pre-charge pressure, fluid enters the accumulator fluid chamber and compresses the gas, thus storing energy. A drop in the fluid pressure at the inlet forces the stored fluid back into the system.

If pressure at the accumulator fluid chamber inlet drops below the gas chamber pressure, the gas chamber becomes isolated from the system by the inlet valve. In such situations, pressure in the gas chamber remains constant and equal to the pre-charge pressure value, while pressure at the inlet depends on pressure in the system to which the accumulator is connected.

Similarly, for a typical prior art spring-loaded accumulator, fluid entering the accumulator fluid chamber compresses the spring, thus storing energy. Since the compressive force of the spring increases as fluid enters the chamber and decreases as the accumulator is discharged, the resultant pressure is not constant. As the spring is preloaded, fluid only starts entering the chamber after the inlet pressure exceeds this threshold.

United States patent publication number US 2010/0018196 A1 is an example of an existing accumulator.

Thus, it can be seen that prior art accumulators are primarily directed at improving consistency of power output by taking some of the peak power of a cyclic operation and re-introducing it into portions of the cycle with a lower-power availability However, this does not assist in cyclic operations with the converse requirements, i.e. cyclic operations with non-constant power requirements. In particular, prior art accumulators do not assist cyclic operations where there is unutilised available power during portions of the cycle, whilst additional power is highly desirable at other portions of the cycle.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein; this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to a first aspect of the present invention there is provided a hydraulic accumulator including:
an energy storage apparatus with a movable first piston face configured to reversibly compress an energy storage medium;

a movable second piston face forming at least part of an inner surface of a corresponding second fluid chamber reversibly expandable by said second piston face;

a movable third piston face forming at least part of an inner surface of a corresponding third fluid chamber reversibly expandable by said third piston face;

wherein said first, second and third piston faces are coupled together.

According to a second aspect of the present invention there is provided a hydraulic accumulator including:

an energy storage apparatus consisting of either:
    a first fluid chamber reversibly expandable by a movable first piston face forming at least part of an inner surface of the first fluid chamber; or
    an elastic medium, capable of moving a first piston face coupled to said elastic medium upon input or release of energy to the medium;

a second fluid chamber reversibly expandable by a movable second piston face forming at least part of an inner surface of the second fluid chamber;

a third fluid chamber reversibly expandable by a movable third piston face forming at least part of an inner surface of the third fluid chamber;

wherein said first, second and third piston faces are coupled together.

According to another aspect of the present invention there is provided a hydraulic accumulator including:

an energy storage apparatus including a first fluid chamber reversibly expandable by a movable first piston face forming at least part of an inner surface of the first fluid chamber;

a second fluid chamber reversibly expandable by a movable second piston face forming at least part of an inner surface of the second fluid chamber;

a third fluid chamber reversibly expandable by a movable third piston face forming at least part of an inner surface of the third fluid chamber;

wherein said first, second and third fluid chambers are coupled together.

As used herein, the term 'piston face' is not limited to movable sealing faces of pistons configured to slide within co-operating cylinder sleeves but also includes a mounting for connecting an elastic medium to the second and/or third fluid chambers.

As used herein, the term 'coupled/coupling' as applied to piston faces and/or fluid chambers includes any mechanical, electrical, fluid, or gas connection, conduit, linkage, pathway, coupling, join, componentry, drives or combination of same that enables the actions, movement, status, or position of one piston face and/or fluid chamber to influence or affect another piston face and/or fluid chamber.

As used herein, the 'piston' includes any configuration with a fluid chamber having at least one inner surface (a 'piston face') reversibly movable with respect to a further fluid chamber inner surface (a 'piston sleeve') to vary the chamber volume, and are not restricted to cylindrical, or constant cross-section piston sleeves, rigid faces or surfaces, or the like.

As used herein, it should be understood the term 'fluid' encompasses both liquids and gases. It will be appreciated by one skilled in the art however that the invention is not limited to hydraulic working liquids and/or pneumatic working gases, and that a variety of fluids may be employed provided they are compressible or incompressible as per the system requirements.

According to one embodiment said second and third fluid chambers are configured to receive a substantially incompressible fluid—hereinafter termed 'hydraulic fluid'.

Preferably, said elastic medium includes springs, elastomeric materials, and any other elastic medium capable of storing and releasing energy from a compressive input.

It will also be readily appreciated by those skilled in the art that utilising gas or spring energy storage in accumulators is well known and conceptually substantially equivalent.

Preferably, the energy storage apparatus includes a first fluid chamber reversibly expandable by said first piston face, said first piston face forming at least part of an inner surface of said first fluid chamber.

According to one embodiment, said first fluid chamber is configured to contain a compressible fluid—hereinafter termed 'accumulator working gas'.

In typical use in a hydraulically-powered drive system, said incompressible fluid is a hydraulic mineral oil or the like while said compressible fluid may be any suitable gas or the like such as nitrogen or other gas capable of stable energy storage under compression.

In a preferred embodiment, said first, second and third fluid chambers are coupled such that said first and third fluid chambers operate antagonistically and said first and second fluid chambers operate co-operatively. Thus, the fluid chambers are coupled such that:
    an expansion of the first fluid chamber creates an expansion of the second fluid chamber and a contraction of the third fluid chamber; and/or
    a contraction of the first fluid chamber creates a contraction of the second fluid chamber and an expansion of the third fluid chamber; and/or
    an expansion of the third fluid chamber creates a contraction of the first and second fluid chambers; and/or
    an expansion of the second fluid chamber creates a contraction of the third fluid chamber and an expansion of the first fluid chamber.

The expansion or contraction of a said fluid chamber may be caused by altering the pressure of the fluid in the fluid chamber or by providing mechanical, pneumatic, or hydraulic force to the appropriate piston face of the fluid chamber.

According to one embodiment utilising a first fluid chamber, said coupling of the piston faces is configured such that;
    expansion of said third fluid chamber by movement of said third piston face causes a contraction of said second fluid chamber and a contraction of said first fluid chamber, by movement of said second and first piston faces respectively.
    expansion of said first fluid chamber by movement of said first piston face causes an expansion of said second fluid chamber and a contraction of said third fluid chamber, by movement of said second and third piston faces respectively.

Preferably, said first fluid chamber includes a sealable fluid inlet, to permit input of said accumulator working gas. In normal use, the quantity of accumulator working gas in the first fluid chamber is substantially fixed after the initial pressurising, with periodic top-ups to address any leakage. The volume of the first fluid chamber, and consequently, the pressure of the accumulator working gas may vary according to the movement of the first piston face.

According to another aspect said first and second piston faces are connected together for common movement.

Preferably, the energy storage apparatus includes a first fluid chamber reversibly expandable by said first piston face, said first piston face forming at least part of an inner surface of said first fluid chamber.

The first and second piston faces may thus be fixed to each other or formed as parts of a common surface or object such that the first and second piston faces move together to respectively alter the volume of the first and second fluid chambers.

Preferably, said first fluid chamber is located within said second fluid chamber or vice versa. It will be appreciated that the first and second fluid chambers may need to be sealed from each other to prevent fluid transfer therebetween.

Preferably, said first and second fluid chambers are concentric.

Preferably, said first and second fluid chambers are:
substantially coaxial; or
have parallel central axes aligned substantially parallel with the direction of said common movement of the first and second piston faces.

Preferably, said energy storage medium includes an elastic medium, capable of moving said first piston face coupled to said elastic medium upon input or release of energy to the medium.

According to a further embodiment, the elastic medium may be located within said second fluid chamber. Movement of the first and second piston faces may be caused by both the expansion of the second fluid chamber (e.g. through increased fluid pressure) and decompression of the elastic medium. The first piston face may be coupled to the second piston face by forming the first piston face as a mounting of the elastic medium to the second piston face and/or as a separate object or surface fixed to the second piston face.

According to one aspect, said accumulator further includes fluid conduits, valves and/or connections configured to allow hydraulic fluid to be concurrently or independently:
input to said third fluid chamber and output from the second fluid chamber, and/or
input to said second fluid chamber and output from the third fluid chamber.

The present invention is particularly suited for use with a mechanical impact hammer and to further reduce prolixity, the present invention will herein be described with respect to use with same. It should be understood this is for illustrative purposes only and in no way limiting.

Typically, gravity impact hammers cyclically lift and drop a large hammer weight to crush rocks and the like, where the hammer weight is lifted by a powered drive mechanism of some form (e.g. hydraulic) and falls freely under gravity. In a development of such gravity drop hammers, the applicant devised a powered drop hammer (as described in PCT publication number WO/2004/035941 and incorporated herein by reference) where the hammer weight is actively driven downwards to impact the surface.

There is a limit to the velocity at which the hammer weight may be lifted without causing damage and wear to the upper portion of the hammer assembly during deceleration of the hammer weight before being driven downwards. However, any additional drive force applied to the hammer weight when falling downwards under gravity is highly desirable to improve the impacting effect. Consequently, an accumulator may be incorporated in the hammer drive mechanism, whereby any un-utilised available power from hydraulic drive mechanism during lifting may be used to store energy in the accumulator, which is then released when the hammer weight is driven down to achieve a greater energy impact. The use of such an accumulator thus enables either a lighter hammer weight to be used to achieve the same impact energy of a heavier hammer or increased impact energy for the same hammer weight.

To further exemplify the advantages of the aforementioned accumulator utilised in a powered drop hammer, it is helpful to expand on the configuration and operation of the hammer, such as outlined in PCT publication number WO/2004/035941. The powered drop hammer includes:
a hammer weight with at least one, and preferably two, drive-engagement surfaces;
a drive projection configured to engage with a said drive-engagement surface on the hammer weight, and
a drive mechanism capable of moving the drive projection reciprocally between two opposed directions.

A drive-engagement surface on the hammer weight may, be configured as a projection from, or a recess into, the hammer weight. As the drive mechanism operates, the drive projection cyclically engages and disengages with each of the drive-engagement surfaces and thereby moves the hammer weight in said opposed directions. Disregarding the impractical case of operating the hammer horizontally, the two opposed directions of the hammer weight can be considered as being either in a direction assisted by gravity (herein referred to as the 'down stroke' or 'power stroke') or in a direction opposed by gravity (herein referred to as the 'up stroke' or 'lifting stroke'). To aid clarity therefore, a drive-engagement surface engaged on the up stroke is herein referred to as the 'lifting surface' and a drive-engagement surface engaged on the power stroke is herein referred to as the 'drive down surface'

The drive mechanism may take any convenient form such as a hydraulic ram or a rotating chain drive or the like. A chain drive is herein considered in more detail for exemplary purposes thought it will be understood that this is in no way limiting.

Thus, in one embodiment, at least one drive projection (also referred to as a 'translation dog') is attached to a drive mechanism in the form of a rotating endless loop of chain passing about two rotational members in the form of sprockets, at least one of which is powered. The driven sprocket is driven by a prime mover, providing high pressure hydraulic fluid flow to a hydraulic motor in the drive mechanism pump. The plane of the chain rotating around the sprockets is positioned alongside a longitudinal (typically planar) face of the hammer weight in order to allow the drive projection to engage with the lifting surface or the drive down surface positioned adjacent the path of the chain. In between the two sprockets, the path of the chain moves in substantially opposing directions aligned with either the lifting surface or the drive-down surface.

The drive mechanism sequentially cycles through four stages, namely:
up stroke:
the drive projection engages with lifting surface as the chain is rotated at the start of the up stroke, and the hammer weight is thereby raised upwards.
upper stroke transition
As the hammer weight reaches its maximum extent of the up stroke travel, the drive projection rotates around the uppermost sprocket and the hammer weight is disengaged from the drive projection. After the drive projection disengages from the hammer weight lifting surface and rotates about the first sprocket, the upward movement of the hammer weight eventually ceases whereupon the hammer weight starts to travel downwards under the force of gravity
down stroke As the hammer weight moves in the reciprocal downwards direction, the drive projection re-engages with the hammer weight via the drive down surface adding additional impetus to the gravitational force driving downwards.

lower stroke transition

The drive projection detaches from the drive down surface before passing around the lower sprocket allowing the hammer weight to strike the impact surface. After passing around the lower sprocket, the drive projection then re-engages with the lifting surface on the hammer weight and the cycle sequence is repeated.

According to the specific configuration of the drive mechanism, the drive projection becomes detached from the drive-down surface as:

the hammer weight velocity downwards exceeds the chain velocity, or the path of the chain travel departs from the trajectory path of the drive down surface.

In alternative embodiments, the drive mechanism may be a ram drive or an endless loop (e.g. a belt or chain) driven about at least two rotational members.

While the up stroke and down stroke are common to each powered drop hammer embodiment, in a drive mechanism embodiment formed from a ram-drive for example, the two transition stages may be of negligible duration.

According to a further aspect, the present invention provides a powered drop hammer substantially as described herein, further including an accumulator substantially as described herein. The operation of the accumulator is integrated into the above-described cyclic operation of the hammer, whereby:

the 'charging stroke' refers to the storing of energy in the accumulator (by compressing the accumulators working gas, or tensioning an elastic medium), performed during lifting of the hammer weight on the up stroke;

the 'power stroke' refers to the discharge of the energy stored in the accumulator to increase hydraulic fluid flow applied to the drive mechanism during the descent of the hammer weight on the down stroke.

According to one embodiment, said powered drop hammer further includes:

a prime mover, providing the source power for providing hydraulic pressure and fluid flow in said drive mechanism.

Preferably, said drive mechanism further includes;

a hydraulic drive motor, converting pressurised hydraulic fluid flow into physical movement to operate the drive mechanism.

A prime mover is a generic term for any appropriate power source, both external to the drop hammer (e.g. power excavators, loaders and the like) or power sources integrated into the powered drop hammer. A "prime mover" for example may include an engine or motor driving a hydraulic pump capable of providing high pressure fluid flow in hydraulic fluid lines.

The hydraulic drive motor in the drive mechanism translates the hydraulic fluid flow into mechanical movement, e.g. driving a drive sprocket for a chain drive embodiment or linear movement in a ram-drive type embodiment.

According to one aspect, the present invention includes hydraulic fluid interconnections including at least one:

pressure line from the prime mover to;
  i. the drive motor;
  ii. accumulator second fluid chamber;
  iii. accumulator third fluid chamber;
drain line inputs to the prime mover from;
  i. the drive motor;
  ii. accumulator second fluid chamber;
pressure line from the accumulator third fluid chamber to;
  the drive motor.

It will be appreciated that the terms "pressure line" and "drain line" refer to the relative pressures inside the hydraulic fluid lines and will be well understood by one skilled in the art to respectively denote fluid at pressures sufficiently high to perform work and sufficiently low to allow the fluid to drain along the fluid lines without performing any meaningful work. A single fluid line may act as the pressure line or drain line depending on the relative pressures inside the fluid line.

In use, the operating cycle of the powered drop hammer, having a starting reference point at the initiation of the hammer weight up stroke with the hammer at its lowest point, (i.e. the impact point with the working surface) preferably includes the steps:

hammer weight up stroke and accumulator charging stroke;
  The accumulator is charged by high pressure flow from the prime mover into the accumulator third fluid chamber. Pressurising the third fluid chamber causes a pressurisation of the accumulator working gas in the first fluid chamber, and
  The hammer weight is lifted by activation of the drive motor by high pressure flow from the prime mover.

upper stroke transition;
  the hammer weight reaches the limit of its upwards travel and the drive mechanism either stops upwards movement or disengages from the hammer weight, and
  The accumulator working gas is compressed to its maximum pressure in the operating cycle.

hammer weight down stroke and accumulator power stroke;
  the accumulator discharges as the high pressure accumulator working gas moves said first piston face to expand the first fluid chamber. The third fluid chamber, coupled to said first fluid chamber therefore contracts, forcing out hydraulic fluid at high pressure to the drive motor. Simultaneously, high pressure hydraulic fluid from the prime mover is input to the second fluid chamber applying pressure on the second piston face, thereby causing the second fluid chamber to expand. As the second fluid chamber expands co-operatively with the first fluid chamber, the force on the second piston face compounds with the force on the first piston face to expel the fluid from the third fluid chamber.
  The drive mechanism thus drives the hammer downwards with a combined power of the compressed accumulator working gas plus the force output of the prime mover. The effective driving force on the hammer weight is thus greater than the maximum possible output of the prime mover.

lower stroke transition;
  the hammer weight reaches the limit of its downwards travel and the drive mechanism either stops downwards movement or disengages from the hammer, and
  the accumulator working gas is at its minimum pressure in the operating cycle. The fluid flow from the prime mover is at low or negligible pressure and is diverted from the second fluid chamber to the drive motor.

Thus, it can be seen that the present invention allows the system to 'scavenge' power (i.e., extract un-utilised power)

from portions of the cycle where there is unused capacity in the prime mover (e.g. the hammer weight up stroke) for storage in the accumulator until it can be applied at a separate stage of the cycle (e.g. the accumulator power stroke) in a compounding manner with the force from the prime mover to give a greater force than the maximum power output of the prime mover.

As an illustrative numerical example, in a conventional system with a prime mover with a maximum power output of 10 kW, 4 kW may be sufficient to raise the hammer weight upwards, whilst the full 10 kW may be applied to the drive motor during the power stroke to drive the hammer weight downwards to impact the working surface. Incorporating an accumulator according to the present invention using the same 10 kW prime mover, the unused 6 kW available for 0.5 seconds during the charging stroke may be used to compress the accumulator working gas, thereby storing 3 kJ of energy. Thus on the power stroke, the drive pump may be driven by a combination of the maximum prime mover power (10 KW) plus the 3 kJ energy release from the compressed accumulator working gas applied for 0.25 seconds (providing 12 kW of power) to give a compounded power output of 22 kW. To attain such a power output using prior art driven hammers would otherwise require the expense and complexity of using a 22 kW prime mover, whilst only 4 kW is needed to raise the hammer weight during the accumulator charge stroke.

Typical variable displacement prime mover hydraulic pumps are only capable of delivering high flow at low pressure or high pressure at low flow rates. However, most hydraulic drive motors are capable of using high flow and high pressure and thus do not match the output characteristics of the prime mover. In contrast, through use of the aforementioned accumulator, preferred embodiments of the present invention are capable of supplying both high pressure and high flow to the drive motor. During the relatively long duration of the charging stroke, the prime mover may provide fluid at high pressure and low flow to pressurise the accumulator whilst raising the hammer weight. During the relatively short duration of the power stroke, the prime mover may provide fluid at high flow and low pressure which, combined with the output of the accumulator, match the need for high acceleration whilst driving the hammer weight downwards.

It will be understood that the present invention may thus be applied to any cyclic system where unused power capacity is available during at least one portion of the cycle and may be added to the maximum available power of the prime mover at one or more separate portions of the cycle so as to compound the total power of the system above that of the prime mover peak power.

The present invention may provide reduced power requirements or increased output for any embodiment with an operating cycle with differing pressure stages/strokes (particularly a low-pressure charge stroke) and with a point in the cycle which would benefit either from increased pressure, increased hydraulic fluid flow or both.

According to a further aspect, the present invention includes:
   an accumulator substantially as hereinbefore described,
   a reciprocating component;
   a drive mechanism capable of moving the reciprocating component reciprocally and/or cyclically.

Preferably, reciprocation of said reciprocating component includes any operating cycle of the apparatus whereby during operation of the apparatus, the reciprocating component repeatedly moves along a path, including linear, non-linear, interrupted, orbital and irregular paths and any combination of same.

Examples of such embodiments include:
   reciprocating machinery that requires double-acting cylinders, e.g. feeders, sawmills, wood splitters, compaction equipment, plastic moulding equipment;
   cyclical machinery that has one high load point in the cycle, e.g. agricultural hay balers, concrete breakers;
   reciprocating machinery of high mass or velocity, where partial regenerative braking of the stroke is desirable, e.g. slewing mechanisms in excavators and cranes.

Preferably, the second and third fluid chambers are located within a common sleeve and separated by a second piston having said second and third piston faces.

Numerous variants and adaptations are possible from the above described embodiments. The accumulator may be constructed with various configurations, though in one preferred embodiment, the accumulator is formed with a double-ended piston assembly located within first and second piston sleeves and having:
   first and second pistons movable within said first and second piston sleeves respectively, to form said first and third fluid chambers respectively,
   said first and second pistons having piston faces within said first and third chambers, respectively defining said first and third piston faces,
   said first and second pistons being coupled together by a connector configured such that expansion or contraction of the first fluid chamber by movement of the first piston face on the first piston causes a reciprocal contraction or expansion of the third fluid chamber by movement of said third piston face of the second piston;
   said first and second pistons being respectively located in said first and second piston sleeves separated by at least one intermediary partition allowing reversibly movable passage therethrough of said connector;
   a second fluid chamber formed from
      said intermediary partition,
      a portion of an inner surface of said second piston sleeve and
      a second piston face, formed on said second piston on an opposing side to said third piston face.

Preferably, a passageway is included in the intermediary partition for passage of said connector between the first and second pistons.

The intermediary partition between first and second piston sleeves is herein referred to in the singular for clarity. However, it should be appreciated that reference to a "partition" is not limited to a single unitary barrier, wall or the like and also refers to partitions formed from multiple walls, barriers, membranes or the like and/or with multiple components, including seals, membranes, coatings, protrusions or any other components.

The above-described embodiment provides manufacturing simplicity in that simple extrusions or machined parts may be used to form both cylinder sleeves which may be assembled together about a common axis, secured by longitudinal bolts through endplates at the distal ends of the first and third fluid chambers.

Optionally, said first and second piston sleeves may be orientated to be longitudinally co-axial. In alternative configurations, the first and second pistons may be coupled via some form of crank shaft, hinged linkage and con-rod, and/or any configuration allowing the pistons to be mutually offset at any angle including a parallel orientation. It follows therefore that the first and second piston sleeves don't need to be coaxial or joined together. The accumulator configuration described above may be varied without departing from the scope of the present invention as long as the first, second and third piston faces are coupled together.

In one embodiment, the first and second pistons are connected to first and second con-rods respectively, said con-rods being pivotally connected to a lever at non-identical positions, said lever being pivotal about a fulcrum. Varying the relative separation between said fulcrum and each of the con-rod connections to the lever varies the corresponding power ratio between the first and second pistons. Standard hydraulic piston/piston sleeves are manufactured in a range of size increments which may be too large to provide the optimal power ration. The ability to easily vary the power ratio between the first and second pistons by simply moving the position of the fulcrum provides an adjustability difficult to obtain economically solely by use of different piston diameters. The capacity to fine tune the power ratio as described above also suits situations where there is a low or high pressure limit, and/or a low maximum pressure differential between first or second piston assemblies.

Further embodiments of the present invention may include incorporation of a signalling mechanism to provide an appropriate signalling input to the hydraulic control circuitry to trigger a changeover between different stages of the operational cycle.

In one embodiment, the signalling mechanism includes a signal port incorporated into a fourth fluid chamber formed in said first piston sleeve between a movable fourth piston face located on the opposing side to said first piston face on said first piston and said intermediary partition surface spanning said first piston sleeve. The signalling port may incorporate a small valve or piston configured to be tripped by sufficient movement of the first piston under the force of the charged accumulator working gas to cause either direct contact between the signalling port piston/valve and said first piston, or the compression of a gas or liquid in the fourth fluid chamber to exceed a threshold level. Conventional signalling means may also be employed such as using a magnetic ring around a piston with an external sensor and other such known methods.

Alternatively, the role of the signalling mechanism may be replaced by a pressure sensor monitoring the pressure in the first fluid chamber.

Either embodiment, i.e. pressure sensor or signalling mechanism, may preferably be configured to be triggered between the end of the power stroke and the start of the charging stroke.

In one embodiment a 'regenerative stage' may be incorporated into the operative cycle. At the end of the down stroke/power stroke, the drive mechanism is disengaged from the hammer weight and the accumulator working gas is discharged of the energy stored during the up stroke/charging stroke as the first piston is at the end of its travel. However, the drive mechanism components, e.g. the drive motor, chain, sprockets and so forth still possess appreciable residual kinetic energy and momentum from their movement during the down stroke/power stroke. The residual drive mechanism kinetic energy may be beneficially absorbed by briefly directing hydraulic fluid from the drive motor back into the third fluid chamber of the discharged accumulator. The temporary diversion of the drive motor fluid flow into the accumulator assists in pre-charging the accumulator working gas and reduces the time required for the drive mechanism to slow to the appropriate rate for the up stroke/charging stroke. The aforementioned signalling mechanism or pressure sensor may also, or alternatively, be configured to be triggered in the regenerative stage to trigger re-direction of the drive pump output to the accumulator third fluid chamber.

The accumulator can essentially be considered to have two 'sides', namely;
- a 'gas-side' consisting of the fixed quantity of accumulator working gas in the first fluid chamber which is cyclically compressed and expanded, and
- a 'liquid side' (also known as an 'oil side') consisting of a variably quantity of incompressible hydraulic fluid passing into and out of the second and/or third fluid chambers.

It will be appreciated that the fluids used in the two 'sides' of the accumulator possess differing fluid and thermodynamic properties and these necessitate differing piston configurations and dimensions to ensure optimum interaction between the gas-sides and oil-sides.

In practice for example, on the gas-side, it is desirable to utilise the accumulator gas pressure at the minimum pressure sufficient to accomplish its tasks effectively, e.g. in a driven hammer example the minimum pressure may be 70 bar. Higher gas pressures inevitably result in gas leakage over time due to the inherent nature of current gas sealing technology.

In comparison, on the 'oil-side', a typical high pressure hydraulic system may operate at a much higher pressure, e.g. 280 bar. Thus, to match the stroke of both the gas and oil-sides in this example, the area of the gas-side first piston face is preferably four times greater than that of the oil-side second and third piston face area. It will be appreciated therefore that the efficiency of the accumulator may be optimised by varying several core parameters to 'tune' the accumulator to different application requirements.

The accumulator parameters that may be varied on the gas and oil sides according to the needs of the particular application preferably include:

Gas-side:
   area of first piston face;
   first piston stroke length;
   gas pressure in the first fluid chamber;
   spring volume, and
   spring rate Oil-side:
   area of second piston face;
   area of third piston face;
   second piston stroke length;
   hydraulic fluid pressure in the second fluid chamber;
   hydraulic fluid pressure in the third fluid chamber.

It will be appreciated however that the force on the oil-side (i.e. total oil-side piston face area×oil-side fluid pressure) must be greater than the force applied by the gas-side (i.e. gas-side piston face area×gas pressure) in order for the accumulator working gas to be compressed, i.e. 'charged'. It will also be appreciated that having a greater oil-side pressure than is required to fully charge the accumulator may not yield any significant benefits.

At their extreme operating limits, prime mover hydraulic pumps normally have an initial reduction in either hydraulic fluid pressure or flow, depending on their design. The accumulator can thus be configured to provide optimum results for either an early flow loss or an early pressure loss.

It will be seen therefore that the present invention provides an accumulator capable of enhancing the performance and/or efficiency of a variety of cyclically and/or reciprocating machinery including powered drop hammers, compactors, feeders, sawmills, wood splitters, compaction equipment, plastic moulding equipment, agricultural hay balers, concrete breakers, slewing mechanisms in excavators and cranes.

BRIEF DESCRIPTION OF DRAWINGS

Further aspects and advantages of the present invention will become apparent from the following description which is given by way of example only and with reference to the accompanying drawings in which:

FIG. 2 shows an end view and partial longitudinal cross-section of the accumulator of FIG. 1a;

FIG. 4b) shows a schematic representation of the second and third stages of a cyclic operation of the accumulator of FIG. 1a operating with the powered drop hammer of FIG. 3;

FIGS. 5a)-d) respectively show the accumulator of FIG. 1a), in longitudinal cross-section, in the first, second, third and fourth stages of the operational cycle of FIGS. 4a-c);

BEST MODES FOR CARRYING OUT THE INVENTION

Figure 1:
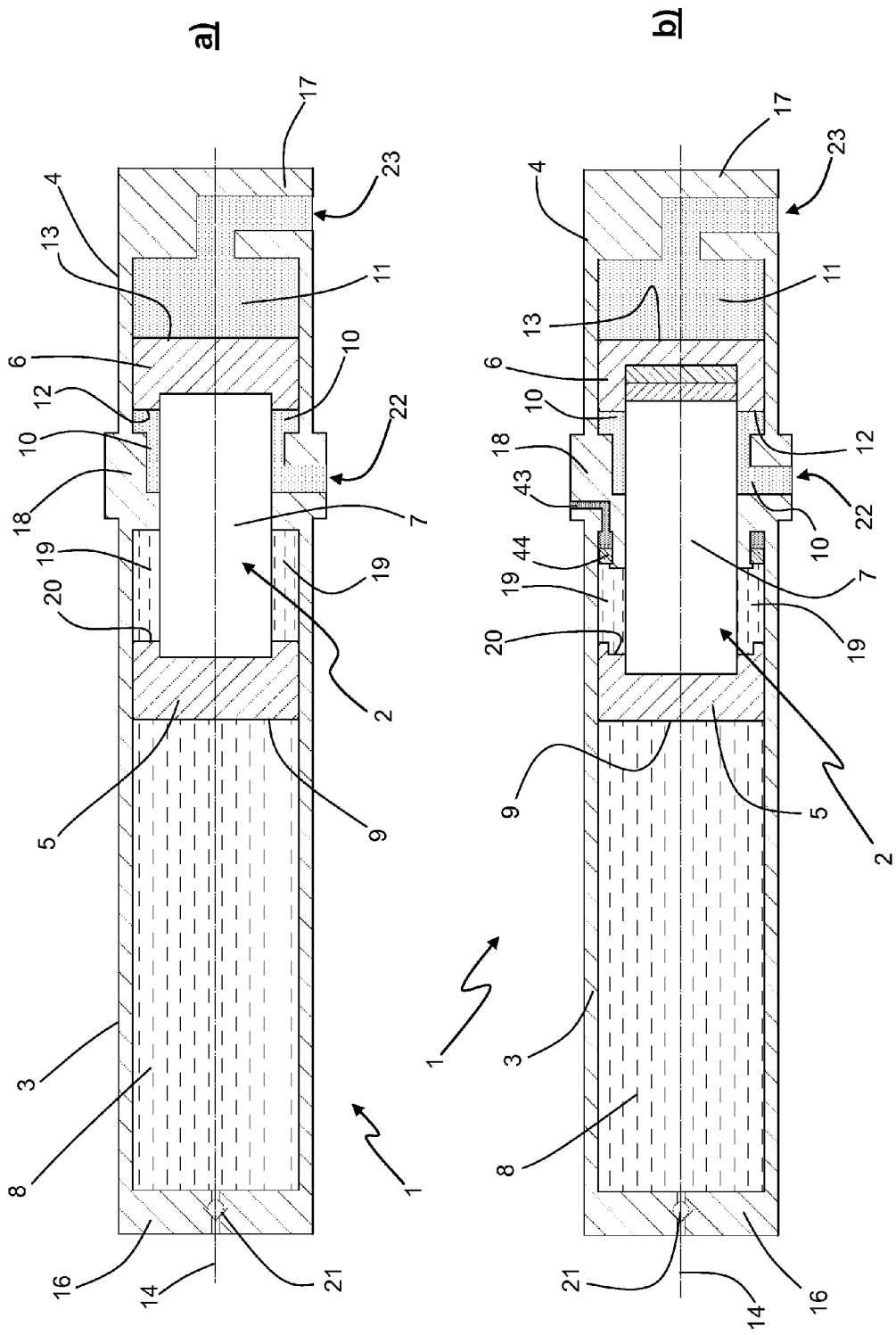
FIG. 1a) shows a longitudinal cross-section of an accumulator according to a first embodiment of the present invention.
FIG. 1b) shows a longitudinal cross-section of the accumulator of FIG. 1a with a signaling port.

Reference numerals for FIGS. 1-10.

(1) accumulator
(2) piston assembly

Reference numerals for FIGS. 1-10.

(3) first piston sleeve
(4) second piston sleeve
(5) first piston
(6) second piston
(7) connector
(8) first fluid chamber
(9) first piston face
(10) second fluid chamber
(11) third fluid chamber
(12) second piston face
(13) third piston face
(14) longitudinal axis
(15) longitudinal bolts
(16) endplate
(17) endplate
(18) intermediary partition
(19) fourth fluid chamber
(20) fourth piston face
(21) valved port
(22) second fluid chamber port
(23) third fluid chamber port
(24) hydraulic connectors
(25) hydraulic connectors
(26) prime mover
(27) hammer assembly
(28) hammer weight
(29) housing
(30) lifting surface projection
(31) drive down surface projection
(32) a drive projection
(33) endless drive chain
(34) upper sprocket
(35) lower sprocket
(36) hydraulic drive motor
(37) pressure line from prime mover (26) to drive motor (36)
(38) pressure line from prime mover (26) to accumulator second fluid chamber(10)
(39) pressure line from prime mover (26) to accumulator third fluid chamber (11)
(40) drain lines to prime mover (26) from drive motor(36)
(41) drain lines to prime mover (26) from accumulator second fluid chamber (10)
(42) pressure line between accumulator third fluid chamber (11) and drive motor (36)
(43) signalling port
(44) signalling piston
(45) first piston seal
(46) second piston seal
(47) piston assembly bearing
(48) piston assembly bearing
(49) rod seal
(50) spring
(51) buffer system
(200) accumulator
(300) accumulator
(303) first piston sleeve
(304) second piston sleeve
(305) first piston
(308) first fluid chamber
(309) first piston face
(310) second fluid chamber
(311) third fluid chamber
(312) second piston face
(313) third piston face
(314) relief valve
(316) endplate
(322) second fluid chamber port
(323) third fluid chamber port
(324) recess
(400) accumulator
(403) first piston sleeve
(405) a first piston
(408) first fluid chamber
(409) first piston face
(410) second fluid chamber
(411) third fluid chamber
(413) third piston face -continued Reference numerals for FIGS. 1-10.

(416) endplate
(417) endplate
(422) second fluid chamber port
(423) third fluid chamber port
(445) spring
(500) compactor
(550) compactor ram
(551) input
(552) hydraulic logic control
(553) piston
(554) compaction housing
(600) accumulator
(603) first piston sleeve
(604) second piston sleeve
(605) first piston
(606) second piston
(607) connector linkage
(608) first fluid chamber
(609) first piston face
(610) second fluid chamber
(611) third fluid chamber
(612) second piston face
(613) third piston face
(614) con rod
(615) con rod
(616) lever
(617) pivot connection
(618) pivot connection)
(619) fulcrum
(622) second fluid chamber port
(623) third fluid chamber port The figures show various embodiments of the present invention in the form of an accumulator and a powered drop hammer incorporating an accumulator.

FIGS. 1a) and 1b) respectively show preferred schematic embodiments of the present invention in the form of a non-signalling and a signalling accumulator. Both embodiments are substantially similar and like parts are numbered with the same reference numerals.

The accumulator (1) in FIG. 1a) includes a piston assembly (2) located in first (3) and second (4) piston sleeves. The piston assembly (2) consists of a double-ended piston comprised of a first piston (5) located inside the first piston sleeve (3) and a second piston (6) located in the second piston sleeve (4), coupled together by a connector (7).

An energy storage apparatus is provided in the form of a first fluid chamber (8) configured to receive and contain an energy storage medium provided in the form of a compressible fluid such as a gas. The first fluid chamber (8) is formed between an end plate (16), the inner surface of the first piston sleeve (3) and a first piston face (9) located on said first piston (5). The second piston (6) forms part of both a second fluid chamber (10) and a third fluid chamber (11) located inside the second piston sleeve (4). A second piston face (12) and a third piston face (13) located on opposing sides of the second piston (6) provide movable sealing surfaces for the second (10) and third (11) fluid chambers respectively.

Figure 2:
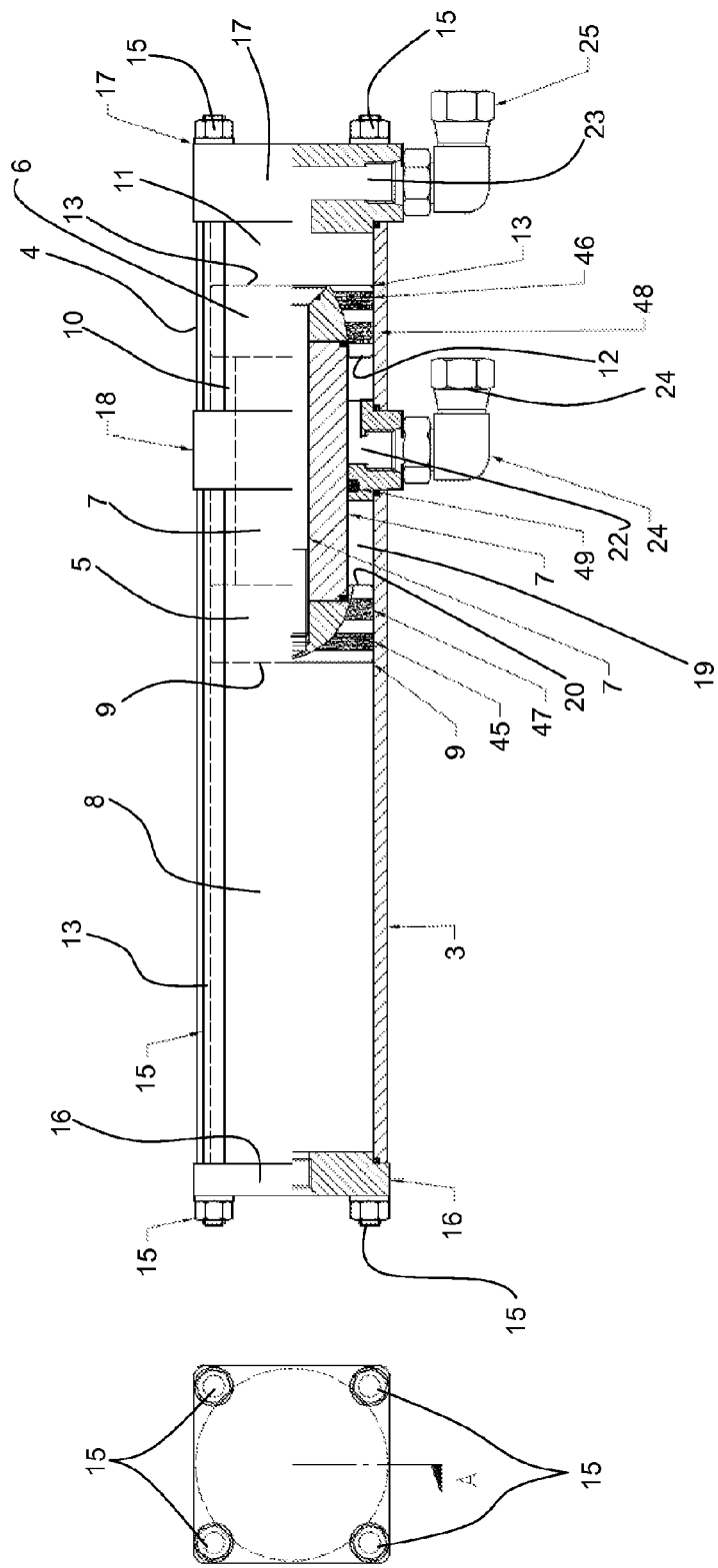

In the embodiments shown in FIG. 1 and FIG. 2, the piston sleeves (3, 4) are configured as cylinders assembled together and orientated about a common longitudinal axis (14). The piston sleeves (3, 4) are secured by longitudinal bolts (15) through respective endplates (16, 17) opposing said first and third piston faces (9, 12), thus delimiting the distal ends of the first and third fluid chambers (8, 11) respectively. Alternative embodiments may use welds, screws or other means for fixing the endplates (16, 17) to the sleeves (3, 4). The first and second pistons (5, 6) are coupled together by a connector (7) in the form of a rigid, linear rod, permitting both pistons (5, 6) to move freely and reversibly together along said longitudinal axis (14) within the piston sleeves (3, 4). Thus, it can be seen that the first, second and third piston faces (9, 12 and 13) are coupled together. Movement of the piston assembly (2), comprised of the first and second pistons (5, 6) and connector (7), causes the first and third fluid chambers (8, 11) to expand and contract antagonistically to each other and the first and second fluid chambers (8, 10) to expand and contract cooperatively.

The connector (7) also passes through an intermediary partition (18) separating the first and second piston sleeves (3, 4). The partition (18) provides a fixed surface forming part of both the second fluid chamber (10) in the second piston sleeve (4) and a fourth fluid chamber (19) located in the first piston sleeve (3). The piston assembly thus effectively provides a double-ended, double sided piston assembly with four reversibly contractible/expandable fluid chambers (8, 10, 11, 19).

The second fluid chamber (10) is defined by the inner surfaces of the second piston sleeve (4), the partition (18) and the second piston face (12) formed on the opposing side of the second piston (4) to the third piston face (13). The fourth fluid chamber (19) is located on the opposing side of the partition (18) and is defined by the inner surfaces of the first piston sleeve (3), the partition (18) and a fourth piston face (20) formed on the opposing side of the first piston (5) to the first piston face (9).

It will be thus readily understood that the fluid chambers (8, 10, 11, 19) are coupled such that said first and third fluid chambers (8, 11) operate antagonistically and said first and second fluid chambers (8, 10) operate co-operatively. Thus an expansion in the first chamber (8) respectively creates an expansion in the second fluid chamber (10) and a contraction in the third and fourth fluid chambers (11, 19) and vice versa. Equally, a contraction in the first chamber (8) respectively creates a contraction in the second fluid chamber (10) and an expansion in the third and fourth fluid chambers (11, 19) and vice versa.

Figure 3:
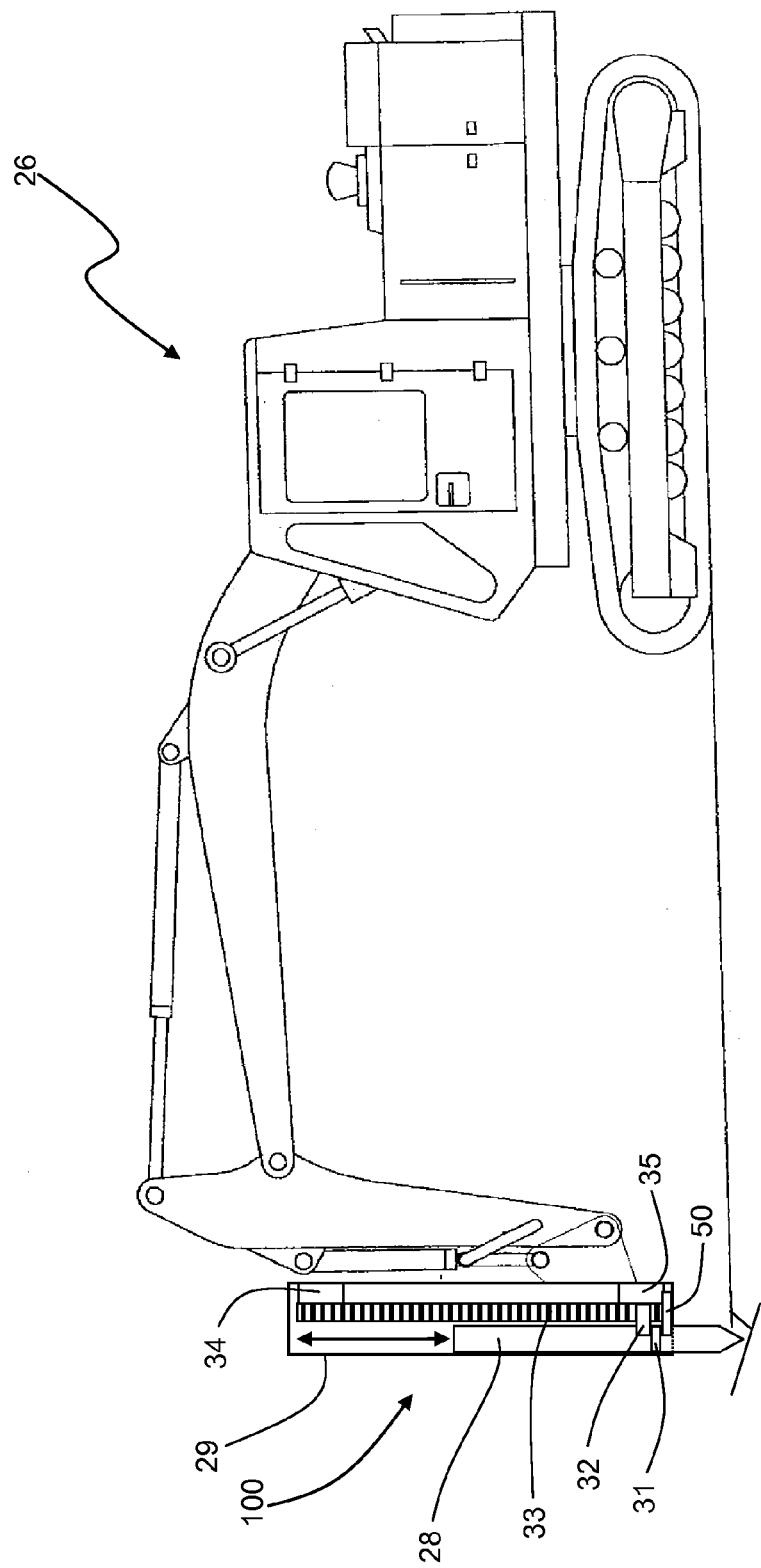
FIG. 3 shows a side elevation of a powered drop hammer and carrier with the powered drop hammer shown in partial section to show interior componentry.

In use, the first fluid chamber (8) is initially filled with a fixed volume of compressible inert gas such as nitrogen via a valved port (21) (shown only in FIG. 1) while the fourth fluid chamber (19) is filled with air at atmospheric pressure or close thereto. The second and third fluid chambers (10, 11) are both configured to receive and expel an incompressible hydraulic fluid via respective ports (22, 23). FIG. 2 shows standard hydraulic connectors (24, 25) fitted to the second and third fluid chamber ports (22, 23) in a variety of cyclic applications where excess motive power capacity is available during parts of the operation cycle and it is desirable to utilise additional power at other parts of the cycle. The accumulator (1) is particularly suited to usage in a powered drop hammer embodiment. FIG. 3 shows a further embodiment of the present invention in the form of a powered drop hammer (100) attached to a prime mover (26) in the form of a tracked carrier. The prime mover (26) is the source of power to operate the drop hammer (100), and is typically provided by the carrier's auxiliary hydraulic pump (not shown individually), connected to the drop hammer (100) via hydraulic fluid lines (not shown in FIG. 3) in known manner. It will be appreciated that the prime mover may take a variety of forms and the usage of a tracked carrier powering an auxiliary hydraulic pump (as shown in FIG. 3) is purely exemplary.

Figure 4A:
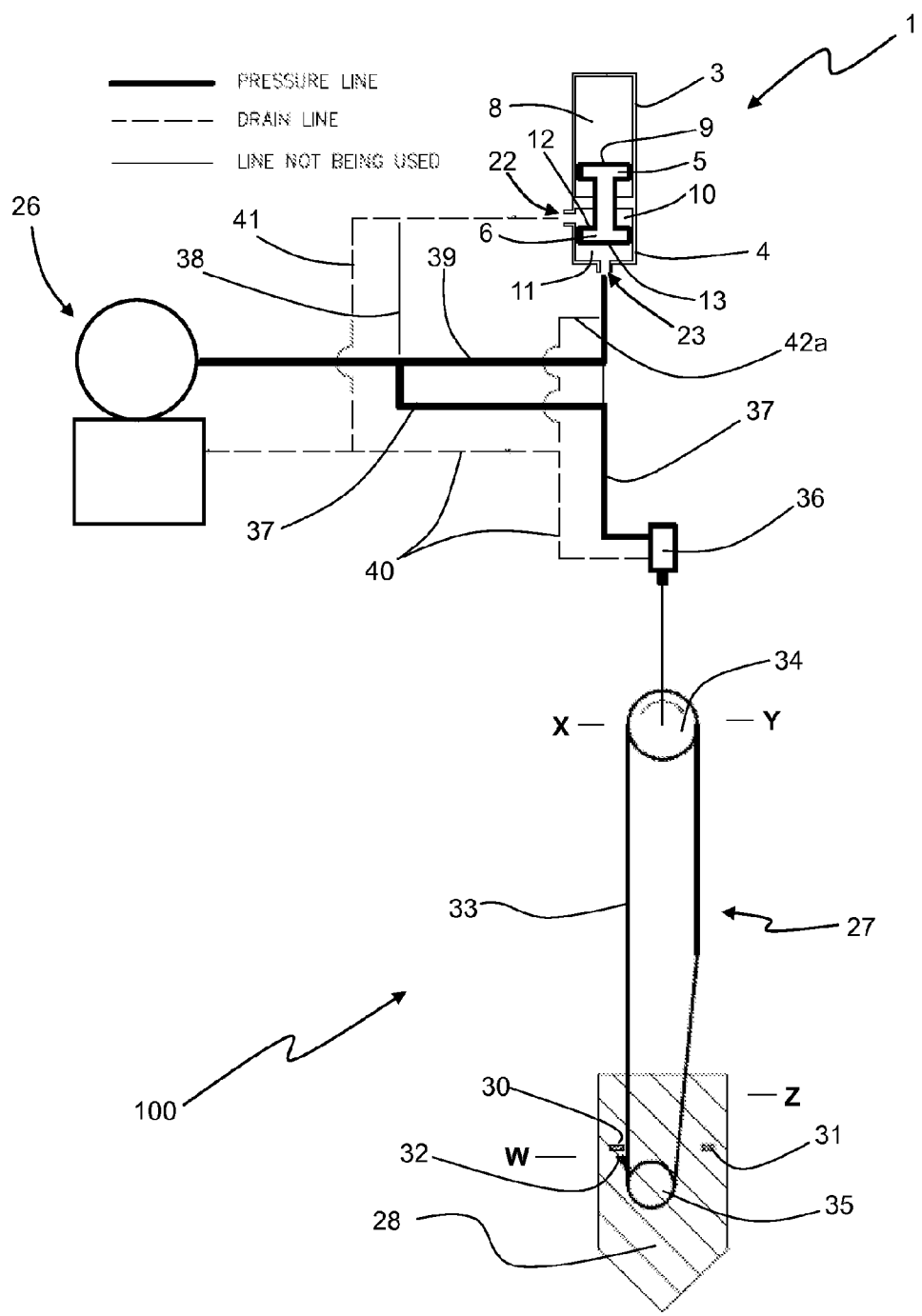
FIG. 4a) shows a schematic representation of the first stage of a cyclic operation of the accumulator of FIG. 1a operating with the powered drop hammer of FIG. 3.
Figure 4C:
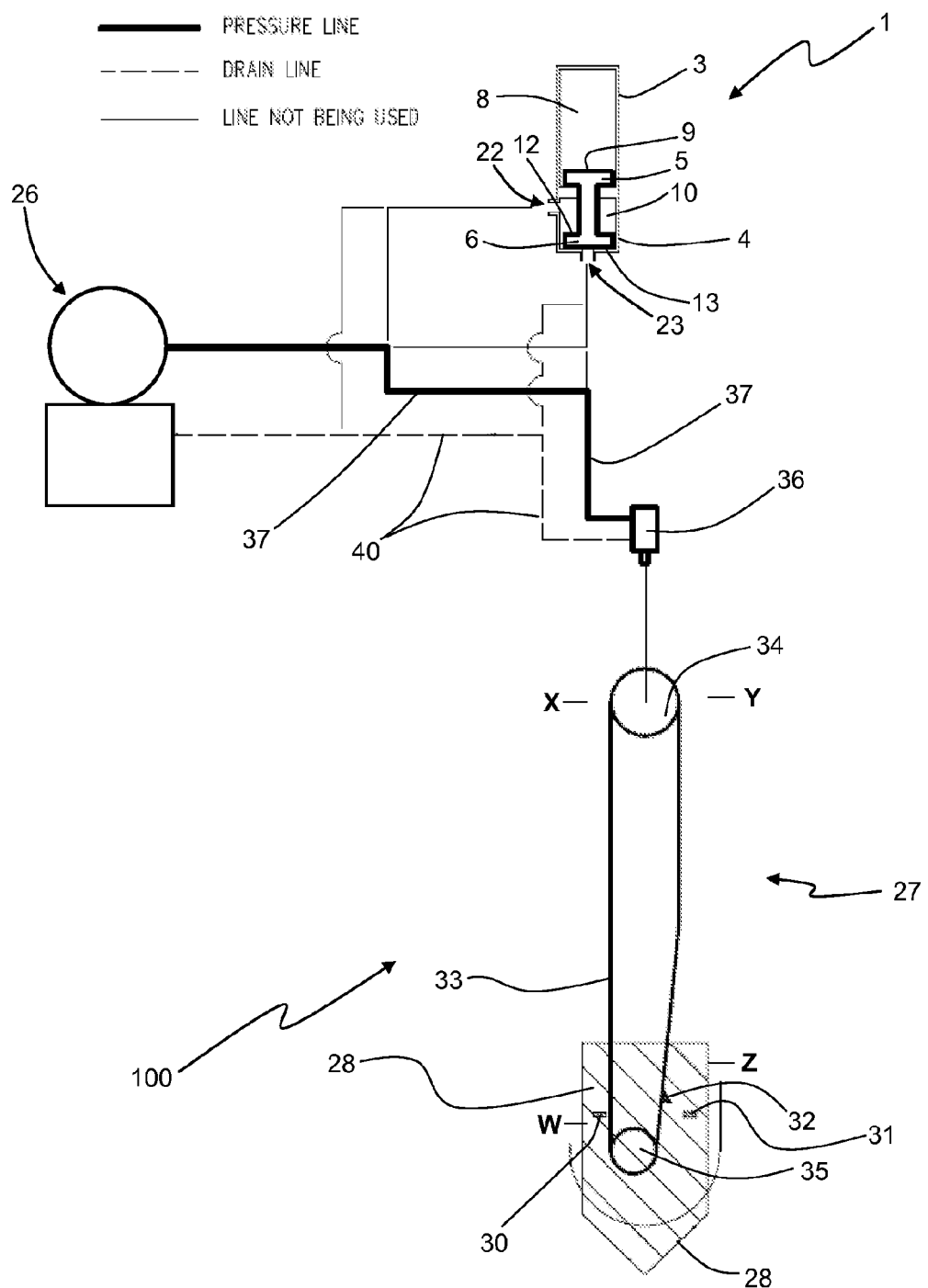
FIG. 4c) shows a schematic representation of the fourth stage of a cyclic operation of the accumulator of FIG. 1a operating with the powered drop hammer of FIG. 3.
Figure 4D:
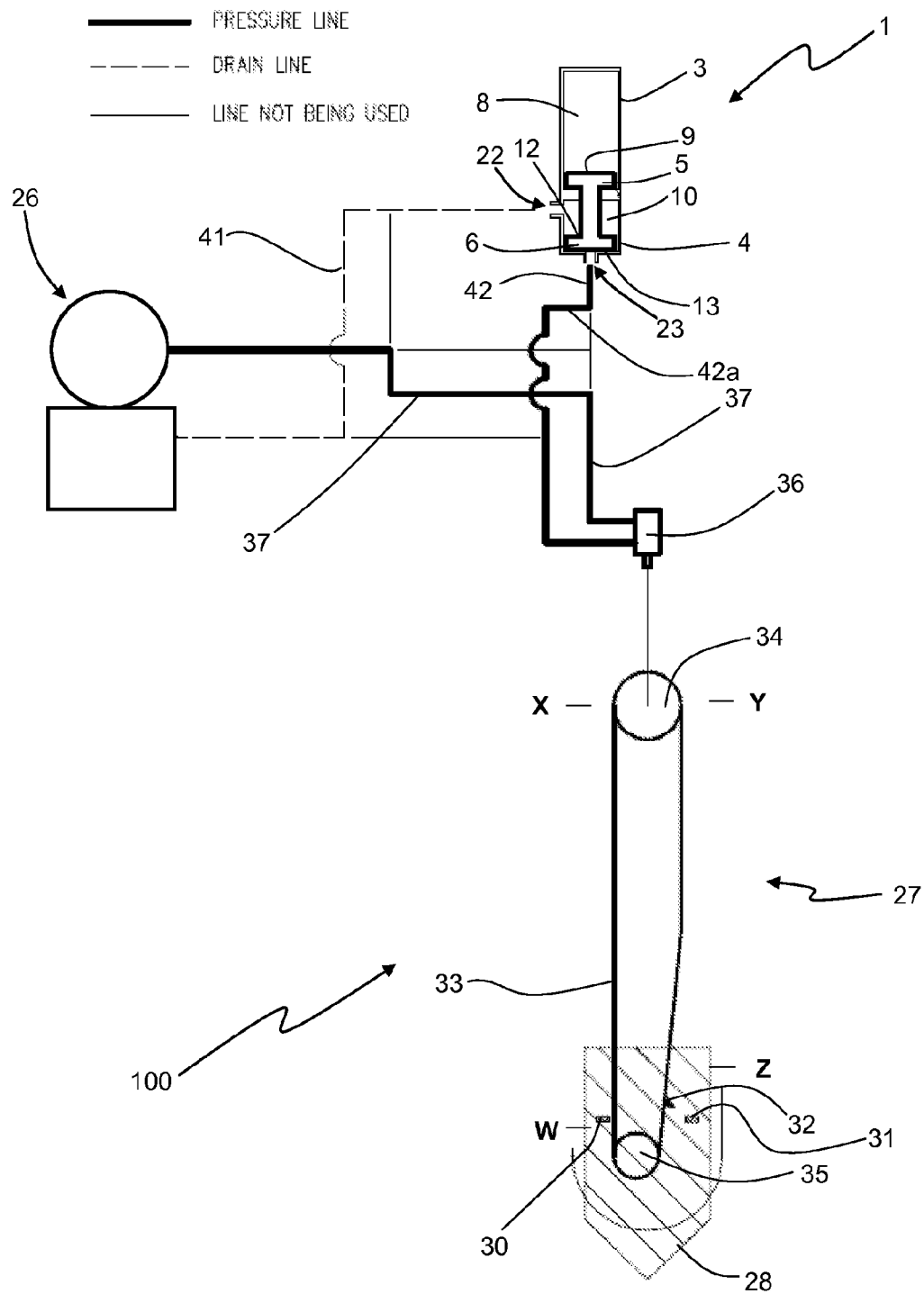
FIG. 4d) shows a schematic representation of an alternative fourth stage to that shown in FIG. 4c) wherein the accumulator of FIG. 1b) is utilised.

FIGS. 4 a-c) respectively show schematic representations of the powered drop hammer (100) incorporating the accumulator (1) operating through four stages of a cyclic operating cycle.

The elements of the powered drop hammer (100) and accumulator (1) apparatus is identical in each of FIGS. 4 a)-c) and reference numerals, particularly those denoting hydraulic fluid lines, are thus not repeated unless necessary for clarity. The powered drop hammer (100) collectively includes: the accumulator (1) as described herein, together with a hammer assembly (27) including:

- a housing (29) (shown only in FIG. 3);
- a hammer weight (28), with two drive-engagement surfaces in the form of a lifting surface projection (30) and a drive down surface projection (31);
- a drive projection (32) configured to engage with either of the drive-engagement surfaces (30, 31) on the hammer weight (28), and
- a drive mechanism in the form of an endless drive chain (33), driven about an upper (34) and lower (35) sprocket by a hydraulic motor (36).

In an application such as a powered drop hammer (100) as described herein, there are intrinsic limitations on the speed at which the hammer weight (28) can be raised as the hammer weight (28) needs to be brought to rest before being driven downwards into the impact surface. The greater the velocity the hammer weight (28) is raised at, the greater height needed for the hammer weight (28) to decelerate unaided, i.e. due to gravity, and/or the stronger the impact shock to be absorbed by a buffer system (51) incorporated into the powered drop hammer system (100). In contrast, it is highly desirable to force the hammer weight (28) downwards at the highest attainable velocity to provide the maximum impact force.

As the drive mechanism operates, the hydraulic motor (36) drives the upper sprocket (34) to rotate the drive chain (33). The drive projection (32) attached to the chain (33) thus moves around the travel path of the chain (33) between the sprockets (34, 35) in two substantially opposing directions. It will be understood that while the drop hammer (100) may operate at a range of angular orientations, the vertical case is considered herein for simplicity and is shown in FIGS. 4a-c). Thus, the path of drive chain (33) and drive projection (32) travels between the sprockets (34, 35) on a vertically upwards and then downwards path, herein referred to as the 'up stroke' and 'down stroke' respectively.

The four stages of the operating cycle (shown in FIGS. 4 a)-c) are:

FIG. 4a. up stroke—from W to X: As the drive chain (33) is rotated at the start of the up stroke, the drive projection (32) engages with the lifting surface projection (30) and the hammer weight (28) is raised upwards.

FIG. 4b. upper stroke transition—from X to Y: As the hammer weight (28) reaches the top of the up stroke, the drive projection (32) rotates around the upper sprocket (34) and the hammer weight (28) disengages from the drive projection (32). The upward movement of the hammer weight (28) momentarily ceases, whereupon the hammer weight (28) then starts to travel downwards under the force of gravity. In preferred embodiments the drop hammer (100) includes an arresting spring (not shown) at the upper portion of the housing (29) to arrest the hammer weight (28) upward movement. The hammer weight (28) acts on the arresting spring against its spring bias until coming to a momentary pause and then the spring releases the energy as an additional driving force to the hammer's downward movement.

FIG. 4b. down stroke—from Y to Z: As the hammer weight (28) moves downwards at the start of the down stroke, the drive projection (32) engages with the drive down surface projection (31) on the hammer weight (28) adding additional impetus to the gravitational force driving downwards.

FIG. 4c. lower stroke transition—from Z to W: Towards the lower portion of the down stroke, the drive projection (32) detaches from the drive down surface (31) before passing around the lower sprocket (35) and the hammer weight (28) continues downward to strike the impact surface (not shown). After passing around the lower sprocket (35), the drive projection (32) then re-engages with the lifting surface projection (30) on the hammer weight (28) and the cycle sequence is repeated.

The operation of the accumulator (1) integrates into the above-described cyclic operation of the hammer, whereby:
the 'charging stroke' refers to the storing of energy in the accumulator (1) by compressing the accumulator's working gas in the first fluid chamber (8). The charging stroke is performed during lifting of the hammer weight (28) on the hammer up stroke (W-X) shown in FIG. 4a;
the 'power stroke' refers to the discharge of the energy stored in the accumulator first fluid chamber (8) to increase hydraulic fluid flow applied to the hydraulic drive motor (36) during the descent of the hammer weight (28) on the hammer down stroke (Y-Z) shown in FIG. 4b.

FIGS. 4 a-c) also show the hydraulic fluid interconnections between the prime mover (26) (represented symbolically as a hydraulic pump and hydraulic oil reservoir), drive motor (36) and the accumulator second and third fluid chambers (10, 11), said interconnections including:

pressure lines (37, 38, 39) respectively from the prime mover (26) to;
the drive motor (36);
accumulator second fluid chamber (10);
accumulator third fluid chamber (11);
drain lines (40, 41) respectively to the prime mover (26) from;
the drive motor (36);
accumulator second fluid chamber (10);
pressure line (42) between the accumulator third fluid chamber (11) and the drive motor (36).

The accumulator (1) is integrated into the operating cycle of the powered drop hammer (100) shown in FIG. 4a-c) as follows:

Considering the initiation of the hammer weight up stroke with the hammer at its lowest point, (i.e. the impact point with the working surface) as the starting reference point of the cycle (as shown in FIG. 4a), the powered drop hammer (100) performs the following steps according to the passage of the drive projection (32) between the positional reference markers W, X, Y, Z shown in FIGS. 4 a-c).

Step I. hammer weight up stroke and accumulator charging stroke, (FIG. 4a, W-X): The accumulator (1) is charged by high pressure flow (39) from the prime mover (26) into the accumulator third fluid chamber (11). Pressurising the third fluid chamber (11) causes a contraction of the coupled first fluid chamber (8) and therefore a pressurisation of the accumulator working gas therein. The hammer weight (28) is raised by activation of the drive motor (36) by high pressure flow (37) from the prime mover (26).

Step II. upper stroke transition, (FIG. 4b, X-Y); The hammer weight (28) reaches the limit of its upwards travel and the drive projection (32) disengages from the lifting surface projection (30) on the hammer weight (28). The accumulator working gas in the first fluid chamber (8) is compressed to its maximum pressure in the operating cycle.

Step III. hammer weight down stroke and accumulator power stroke (FIG. 4 b, Y-Z): The accumulator (1) discharges as the high pressure accumulator working gas moves the first piston face (9) to expand the first fluid chamber (8). The third fluid chamber (11), coupled to said first fluid chamber (8) therefore contracts, forcing out hydraulic fluid through outlet (23) through high pressure line (42) to the drive motor (36). Simultaneously, high pressure hydraulic fluid in pressure line (38) from the prime mover (26) is input to the second fluid chamber (10) applying pressure on the second piston face (12), thereby causing the second fluid chamber (10) to expand and the coupled third fluid chamber (11) to contract.

As the second fluid chamber (10) expands co-operatively with the first fluid chamber (8), the force on the second piston face (12) compounds with the force on the first piston face (9) to expel the fluid from the third fluid chamber (11). The drive mechanism thus drives the hammer weight (28) downwards with the combined power of the compressed accumulator working gas in the first fluid chamber (8) plus the power of the prime mover (26) via the second piston face (12) of the second fluid chamber (10).

Step IV. lower stroke transition (FIG. 4c, Z-W): The drive projection (32) disengages from the drive down surface projection (31) on the hammer weight (28) which travels downward until impacting the working surface (not shown). The accumulator working gas in the first fluid chamber (8) is at its minimum pressure in the operating cycle. The fluid flow from the prime mover (26) is diverted from the second fluid chamber (10) to the drive motor (36) at low or negligible pressure until the drive projection (32) passes around the lower sprocket (35) and re-engages with the hammer weight (28) to repeat the cycle.

FIG. 4 d) relates to a variant of the above described operating cycle and uses the accumulator embodiment shown in FIG. 1 b) which incorporates a signalling mechanism located in the fourth fluid chamber (19). The signalling mechanism is comprised of a signalling port (43) incorporating a signalling piston (44) (or in alternative embodiments a small valve (not shown)) configured to be tripped by movement of the fourth piston face (20) causing either direct contact between the signalling piston (44) and said fourth piston face (20), or the compression of a gas or liquid in the fourth fluid chamber (19) to exceed a threshold level. The signalling mechanism can be used to trigger a 'regeneration step' in the above operating cycle during the lower stroke transition in step IV, as follows:

Step IV. lower stroke transition and accumulator regeneration (FIG. 4 d, Z-W): The drive projection (32) disengages from the drive down surface projection (31) on the hammer weight (28) which travels downward until impacting the working surface (not shown). The accumulator working gas in the first fluid chamber (8) is at its minimum pressure in the operating cycle. The drive mechanism including the drive motor (36), drive chain (33), drive projection (32) and sprockets (34, 35) still possess appreciable kinetic energy and momentum after being disengaged from the hammer weight (28). The residual drive mechanism kinetic energy is transferred to the accumulator (1) by briefly directing hydraulic fluid from the drive motor (36) back into the third fluid chamber (11) via hydraulic line (42a). This temporary diversion of hydraulic fluid from drive motor (36) into the third fluid chamber (11) assists in pre-charging the accumulator working gas in the first fluid chamber (8) and reduces the time required for the drive mechanism to slow to the appropriate rate for the up stroke/charging stroke. Once the speed of the drive motor (36) has dropped sufficiently to match the initial flow rate required to lift the hammer weight (28), the prime mover (26) hydraulic output is directed to the drive motor (36) via hydraulic line (37) and the operational cycle from Step I repeats.

It will be appreciated that the triggering for the accumulator (1) regeneration stage provided by the signalling mechanism may be provided by alternative means, e.g. electronically monitoring the pressure drop in the accumulator first fluid chamber (8) for example.

FIGS. 5 a)-d) show an enlarged view of the accumulator (1) during the operational cycle Steps I-IV described above. FIG. 5a corresponds to the start of step I (Z-W) where the accumulator (1) is fully discharged, the working gas in the first fluid chamber (8) is at a minimum (i.e. the pre-charge pressure) and all the hydraulic fluid has been expelled from the third fluid chamber (11).

In FIG. 5 b), corresponding to a midpoint in between step I (Z-W), the accumulator is partially charged, with the first fluid chamber (8) partially compressed and the third fluid chamber (11) partially filled with hydraulic fluid.

FIG. 5 c) shows the accumulator (1) in a charged configuration corresponding to step II, where the first fluid chamber (8) is fully compressed with the working gas at maximum pressure and the third fluid chamber (11) at maximum expansion (X-Y).

In FIG. 5 d), the accumulator (1) corresponds to step III, with the first fluid chamber (8) partially discharged and the third fluid chamber (11) partially contracted (Y-Z).

In the following embodiments, parts which are identical or equivalent to like parts in the above embodiments are like numbered.

Figure 6:
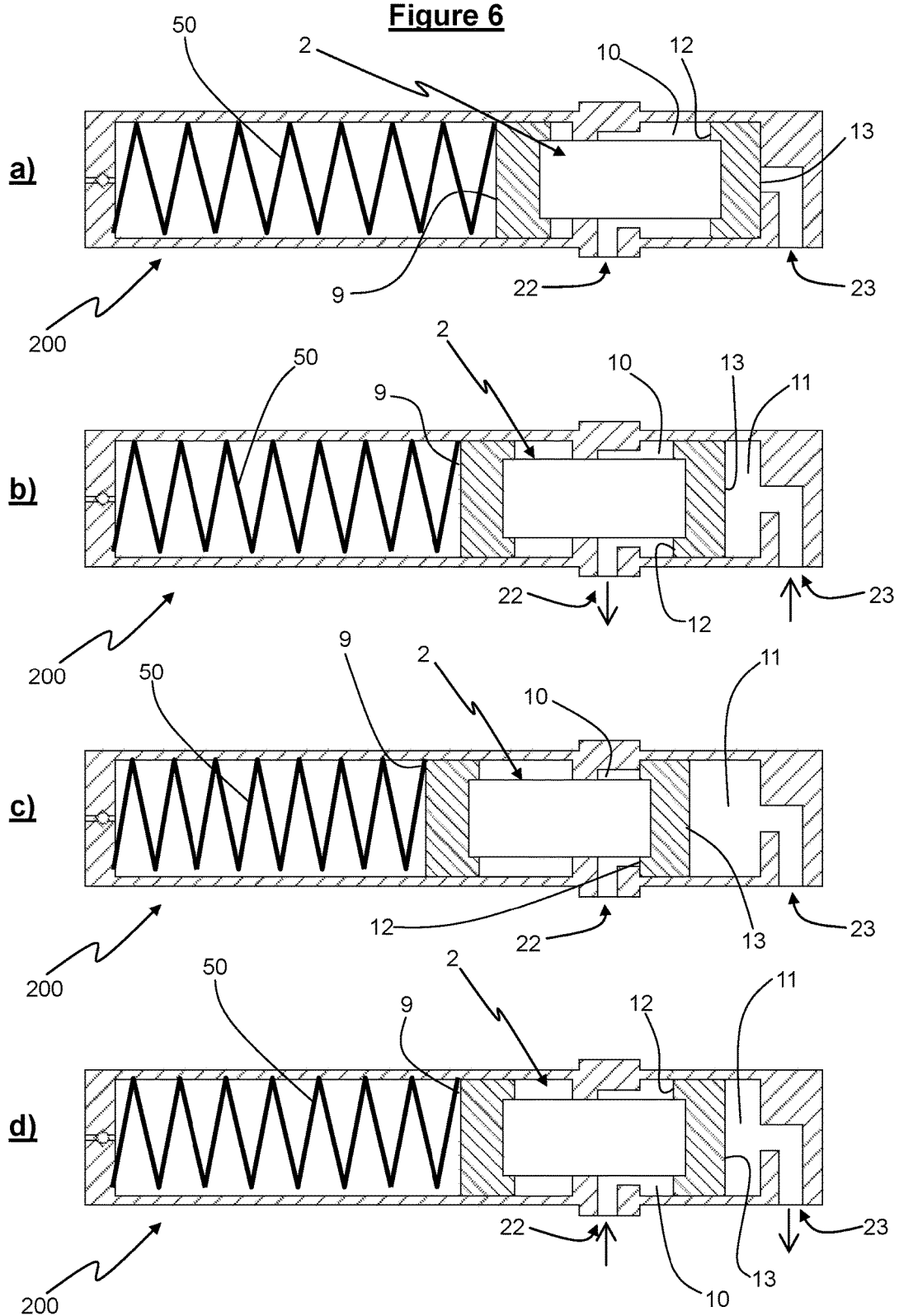
FIGS. 6a)-d) respectively show a second embodiment of an accumulator, in longitudinal cross-section, in the first, second, third and fourth stages of the operational cycle of FIGS. 4a-c)

FIGS. 6 a-d) show an alternative embodiment of the present invention in the form of an accumulator (200), identical to the accumulator embodiment (1) shown in FIGS. 5 a-d) with the exception of the accumulator working gas in the first fluid chamber (8) being replaced by an elastic media in the form of a compression spring (50). The accumulator shown in each of FIGS. 5a-d) operates in an identical manner to the accumulator (1) embodiment in FIGS. 1-5, with each individual figure of FIGS. 6 a-d) corresponding to the same stage in the operational cycle as the accumulator (1) described with respect to each of FIGS. 5 a-d) respectively. The operation of the spring (50) is equivalent to the working gas in the first fluid chamber (8) of FIGS. 1-5, i.e. compression of the spring (50) is equivalent to compression of the working gas.

Figure 7:
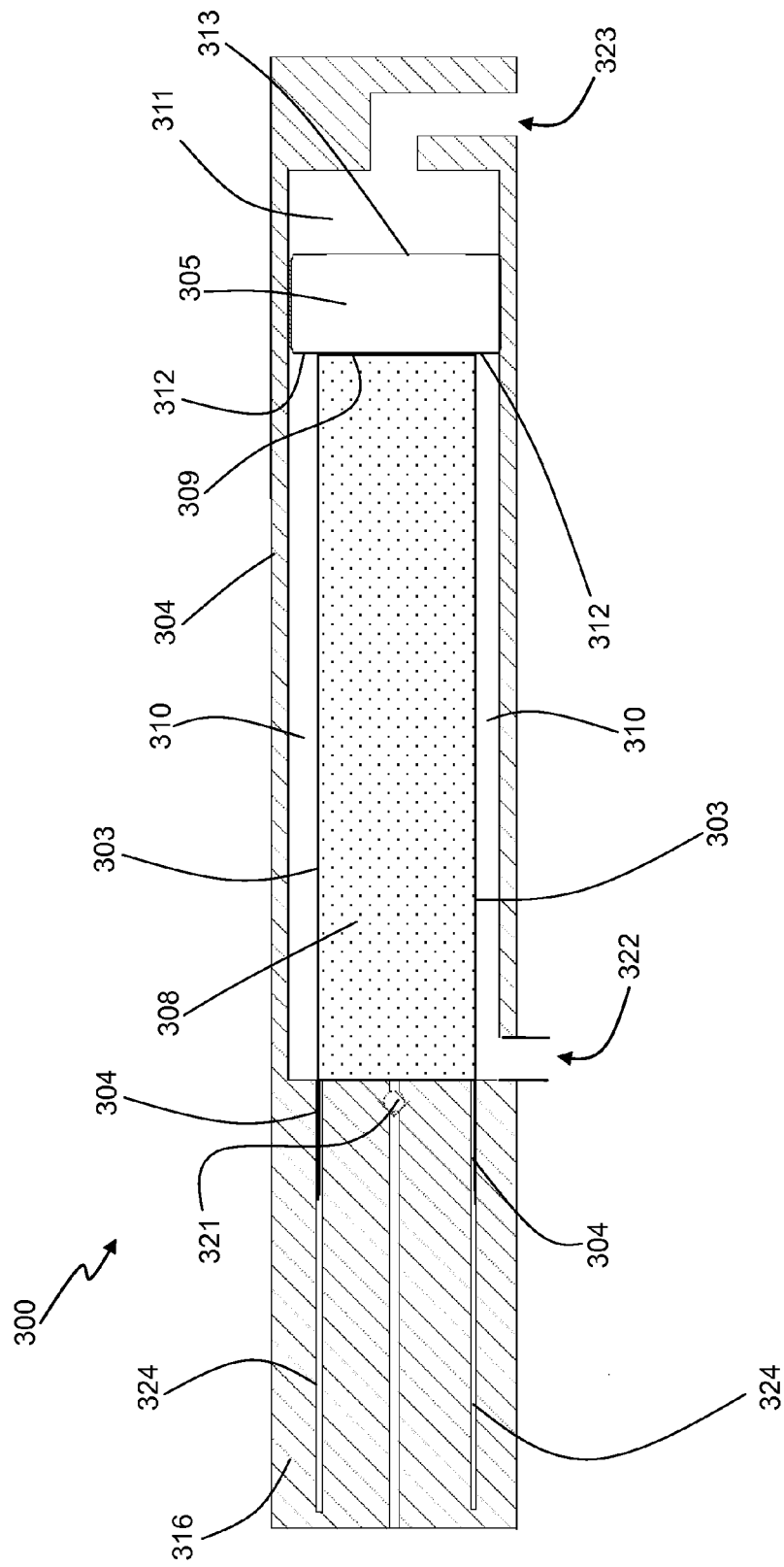
FIG. 7 shows a longitudinal cross-section of an accumulator according to a third embodiment of the present invention.

FIG. 7 shows a further embodiment of the present invention in the form of an accumulator (300) configured with a first fluid chamber (308) and a second fluid chamber (310) with respective first and second piston faces (309, 312). The first fluid chamber (308) is located inside the first piston sleeve (303), which is itself located co-axially and concentrically within a second piston sleeve (304) forming the outer surface of the second fluid chamber (310). The inner surface of the second fluid chamber (310) is formed by the outer surface of the first piston sleeve (303). The first fluid chamber (308) is filled with accumulator working gas via relief valve (321) as per the previous embodiments. However, instead of the second fluid chamber (310) being coupled to the first fluid chamber (308) via a connector passing through an intermediate partition to a separate piston, the first fluid chamber (308) is located within the second fluid chamber (310). The first and second piston faces (309, 312) are located on the same side of a common first piston (305). The opposing side of the first piston (305) provides the third piston face (313) forming part of a third fluid chamber (311) with a hydraulic fluid outlet (323).

The first and second fluid chambers (308, 310) are sealed from each other by a first piston sleeve (303) attached to the first piston face (309) to prevent fluid transfer therebetween. As the first piston (305) travels within a second piston sleeve (304), the first piston sleeve (303) slides into an annular recess (324) within the endplate (316) to maintain the fluid/gas separation between the first and second fluid chambers (308, 310). In all other operational and functional aspects, the accumulator (300) is identical or equivalent as the accumulator (1) in the embodiments shown in FIGS. 1-5.

Figure 8:
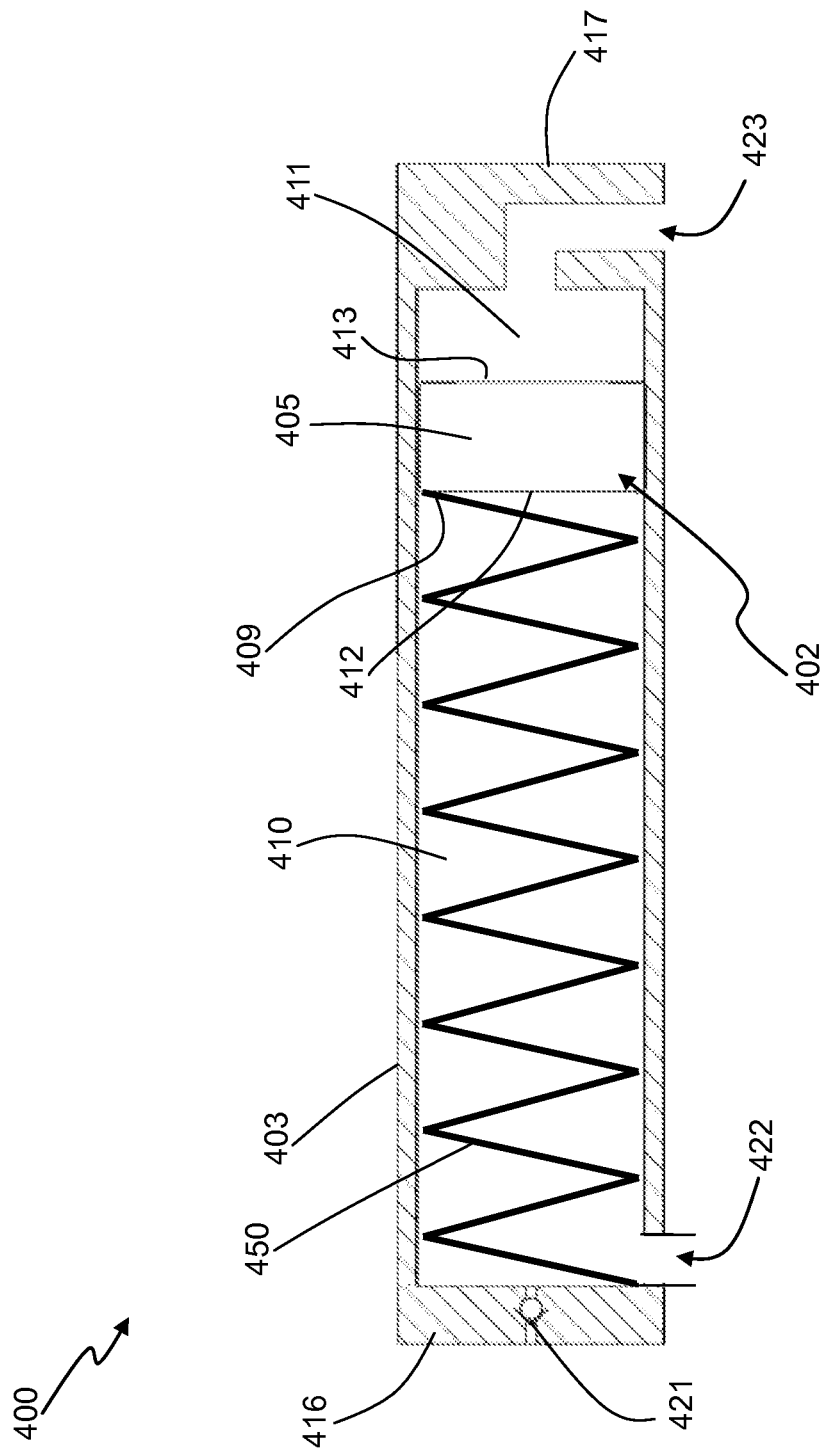
FIG. 8 shows a longitudinal cross-section of an accumulator according to a fourth embodiment of the present invention.

FIG. 8 shows a further embodiment of the present invention in the form of an accumulator (400) configured with a first piston (405) inside a first piston sleeve (403). Instead of an accumulator working gas, the accumulator (400) includes an energy storage medium in the form of an elastic media. Although the elastic media may take several forms, the embodiment represented in FIG. 8 incorporates an elastic media in the form of spring (450) located inside the first piston sleeve (403) in a fluid chamber (410) bound by a fixed endplate (416) and the first piston face provided in the form of spring mounting (409) on the first piston (405). Hydraulic fluid from the prime mover (not shown) may also be pumped into the same fluid chamber (410) via inlet (422). It can thus be seen that the spring (450) and 'second' fluid chamber (410) operate respectively as the functional equivalents of the separate physical first fluid chambers (8, 10) in the embodiments shown in FIGS. 1-5. The spring (450) and fluid chamber (410) are both formed in this embodiment by the same physical chamber (410) bounded by the first piston sleeve (403), a fixed endplate (416) and the first piston face (409). The third fluid chamber (411) (with third piston face (413), fluid outlet (423) and endplate (417)), is directly equivalent to the third fluid chamber (11) in the previous embodiments of FIGS. 1-5.

Figure 9:
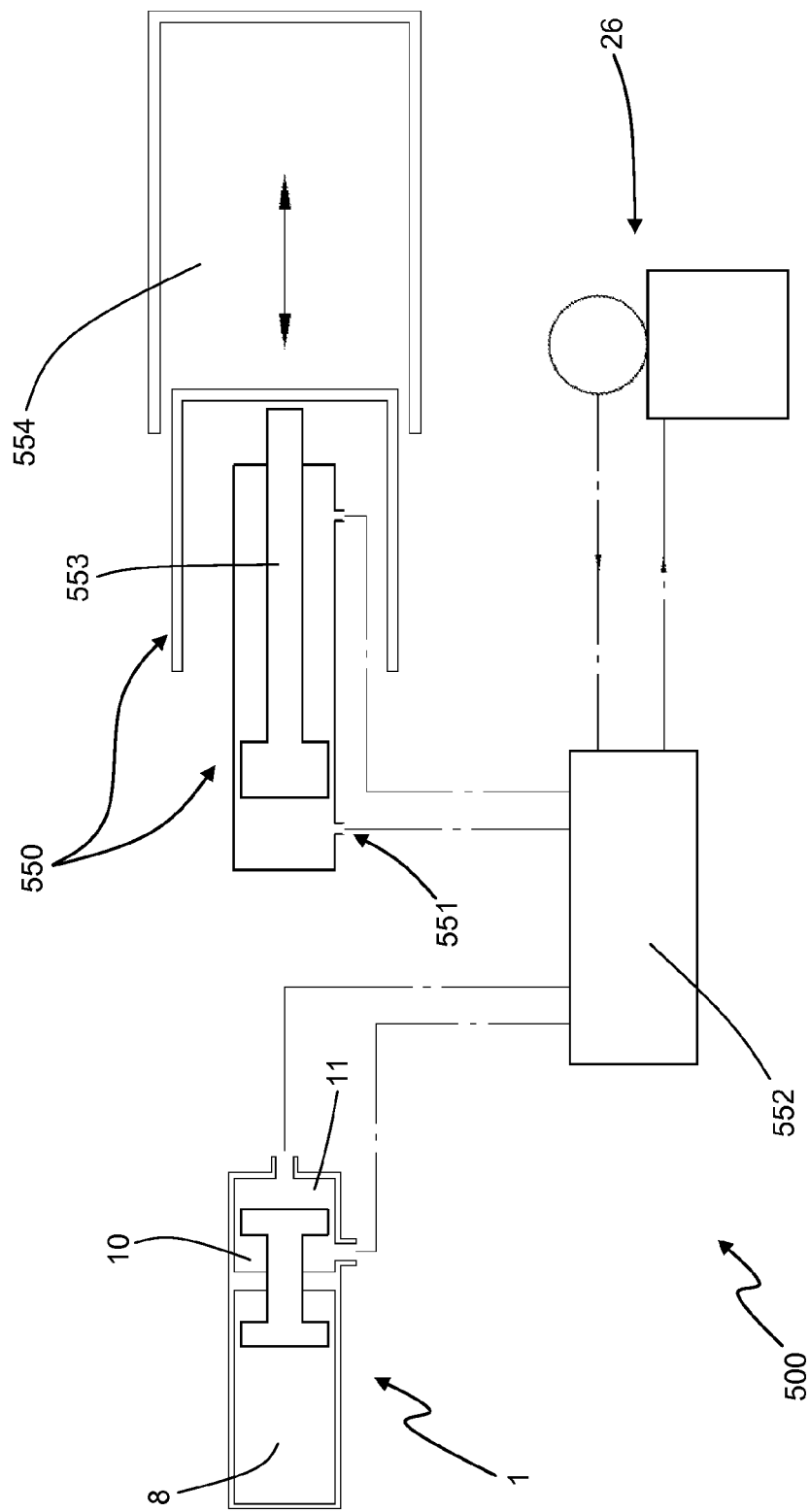
FIG. 9 shows a schematic representation of the accumulator of FIG. 1a) operating with a compactor ram.

As previously discussed, it can be seen that the present invention is implementable in a variety of forms and applications incorporating cyclically and/or reciprocating machinery including powered drop hammers, compactors feeders, sawmills, wood splitters, compaction equipment, plastic moulding equipment, agricultural hay balers, concrete breakers, slewing mechanisms in excavators and cranes FIG. 9 shows a further exemplary embodiment of the present invention in the form of a compactor (500) including an accumulator (1) as previously described. The compactor (500) includes a compactor ram (550) with a high pressure input (551) supplying hydraulic fluid from the prime mover (26) at high pressure, via a hydraulic logic control (552) to drive a piston (553) in the compactor ram (550). FIG. 9 shows the ram (550) driving into a compaction housing (554) to compact any material therein, e.g., waste material, landfill refuse, cars or the like. The compactor ram (550) receives additional hydraulic fluid flow from the accumulator (1) during the extension of the ram (550) to assist in crushing the material in the compaction housing (554). On the return stroke of the ram (550), less power is required and thus unutilised capacity may be stored in the accumulator (1), as previously described, until being released on the next compacting step.

Figure 10:
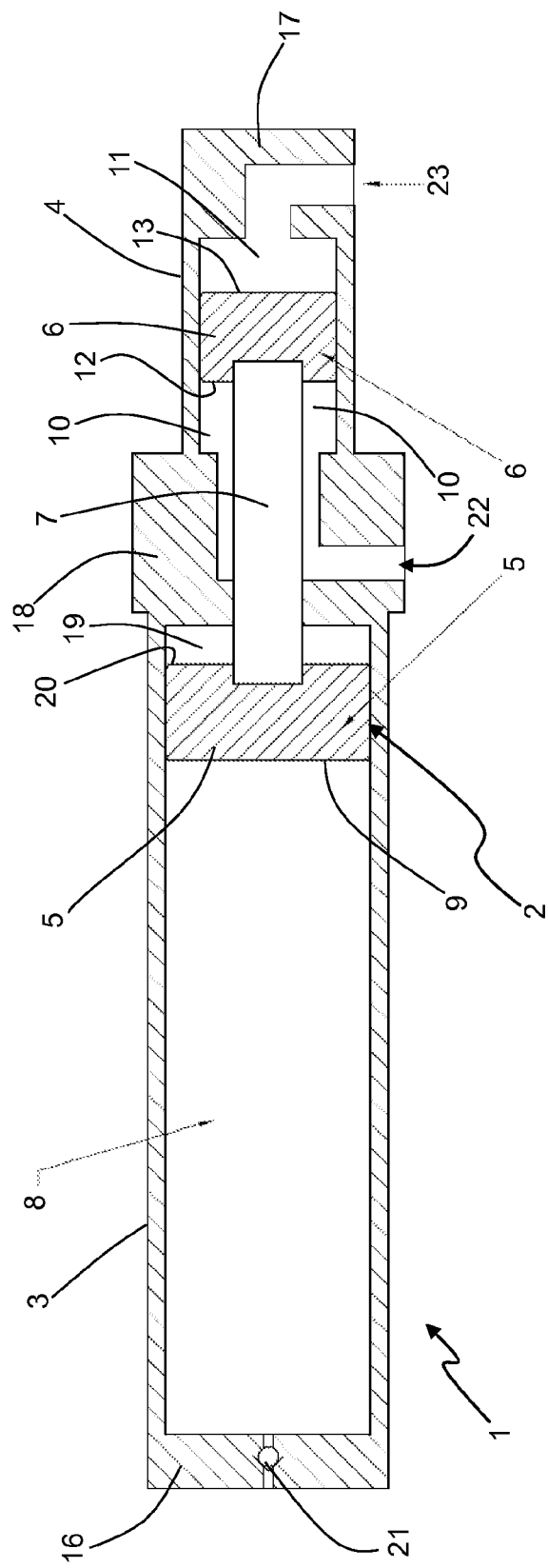
FIG. 10 shows a longitudinal cross-section of an accumulator according to a fifth embodiment of the present invention.

It should be appreciated that the embodiments illustrated in FIGS. 1-9 are symbolic and not necessarily to scale. FIG. 10 shows an alternative embodiment of the accumulator (1) where the first and second piston sleeves (3, 4) are different diameters. Consequently, this results in a different surface area for the first piston face (9) compared to the second and third piston faces (12, 13). This difference in piston face surface area is desirable in order to balance the different performance characteristics of the gas side (first fluid chamber (8)) and the oil side (second and third fluid chamber (10, 11)). The accumulator working gas in the first fluid chamber (8) is preferably maintained at the minimum pressure practicable (e.g. 70 bar) to reduce gas leakage over time. However, the hydraulic 'oil side' ideally operates at a much higher pressure, e.g., four times higher (280 bar). FIG. 10 shows a first piston face (9) with four times the surface area of the second and third piston faces (12, 13), thus giving an ideal gas/oil side pressure ratio. The accumulator gas side/oil side configuration may be adjusted by varying at least one of;

the gas-side parameters of:
area of first piston face (9);
first piston (5) stroke length;
working gas pressure in the first fluid chamber (8);
the volume of the spring (50);
and/or
the oil-side parameters of:
area of second piston face (12);
area of third piston face (13);
second piston (6) stroke length.

Table 1 below illustrates the effects of changes in the aforementioned parameters on the accumulator (1) performance according to different system requirements.

TABLE 1

| Accumulator performance variables | | |
|---|---|---|
| System Requirements | Accumulator configuration | comment |
| Very low pressure gain of accumulator working gas in first fluid chamber (8) | Large volume of accumulator relative to working volume | Provides most constant power output |
| High pressure systems | Area of third piston face (13) is smaller than area of first piston face (9) | Volume of first fluid chamber (8) needs to be large |
| Low pressure systems | Are of third piston face (13) is similar to area of first piston face (9) | |
| Long period to charge accumulator with unutilised capacity (i.e. long 'scavenge' period) | Large working gas volume in first fluid chamber (8) can be at low pressure or excess can be dumped | Typical reciprocating cylinder application where return speeds need to be constrained - produces maximum power gain |
| Short period to charge | Small working gas volume in | Typical regeneration circuit |

TABLE 1-continued

Accumulator performance variables

| System Requirements | Accumulator configuration | comment |
|---|---|---|
| accumulator with unutilised capacity (i.e. short scavenge period) | first fluid chamber (8) at high pressure | for an excavator or the like |
| Large difference between scavenge pressure and pump pressure | Large working volume, can be at low pressure or excess can be dumped I | Maximum power gain |
| Small additional power requirement | Second piston face (12) can be small relative to third piston face (13) with a short stroke | Accumulator is small and economical |
| Large additional power requirement | Third fluid chamber (11) must be large, scavenge time must be long with low pressure requirement, area of second piston face (12) small relative to area of third piston face (13) | Large power gain - high benefit from accumulator |
| Power delivered mainly as extra hydraulic fluid flow | A large third fluid chamber (11) and a small second piston face (12) area relative to area of third piston face (13) | Needs long scavenge time |
| Power delivered mainly as extra pressure | Area of second and third piston face as large as possible | |

It can be thus seen the accumulator may be configured to accommodate a wide range of the differing system requirements. As previously discussed typical prime movers exhibit particular characteristics e.g., high flow/low pressure from a large excavator or low flow/high pressure from a smaller excavator. While such characteristics are inherent to the particular configuration of the individual excavator and cannot be changed, the accumulator may be easily configured to suit the prime mover's characteristics. The operator is thus able to inexpensively optimize the accumulator to match the prime mover (as illustrated in table 1), rather than incurring the high cost of purchasing a new prime mover or incurring the operational inefficiencies of using mismatched characteristics.

Figure 11:
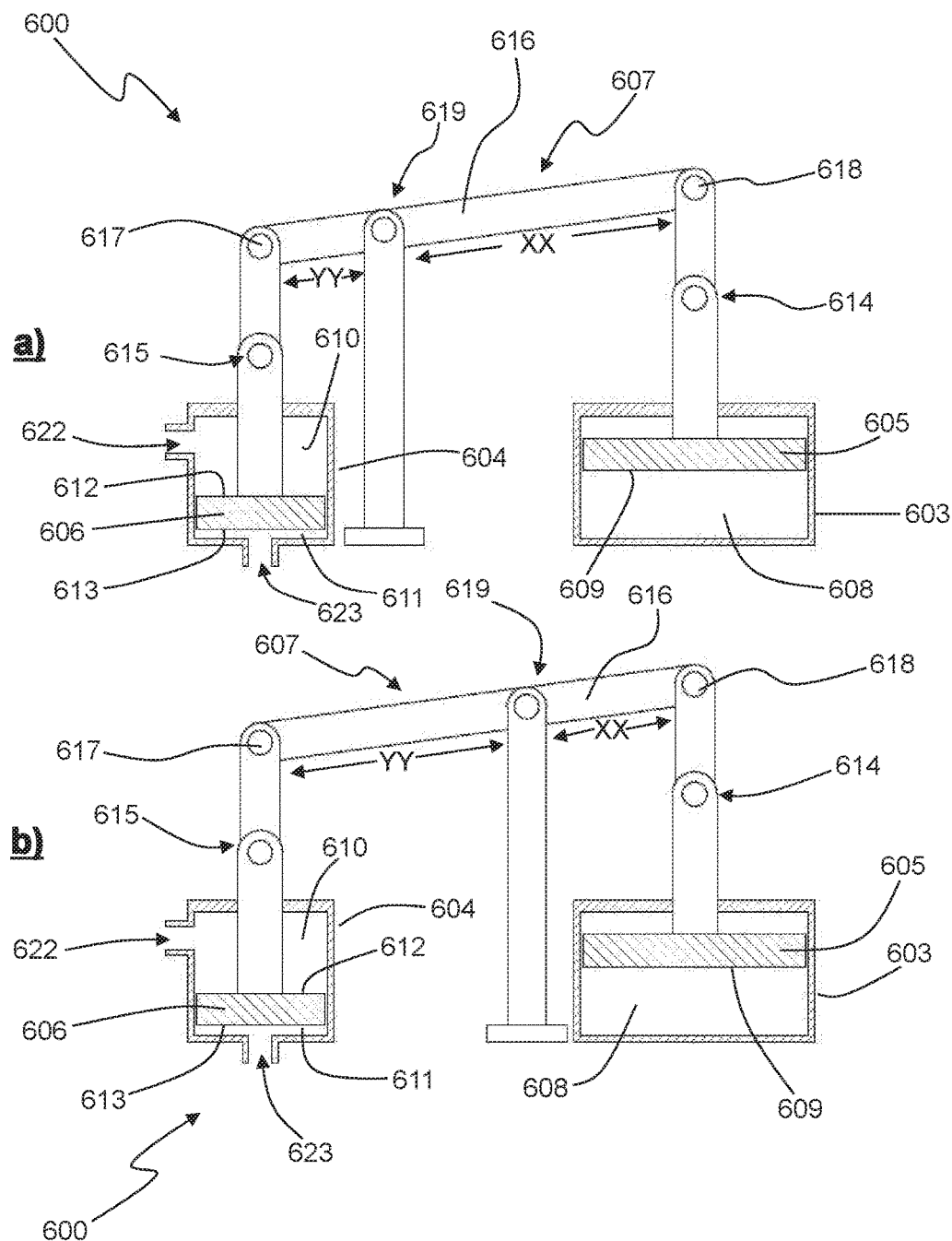
FIG. 11a shows a longitudinal cross-section of an accumulator according to a sixth embodiment of the present invention.
FIG. 11b shows a longitudinal cross-section of an accumulator according to a seventh embodiment of the present invention.

FIG. 11 shows a further embodiment of the present invention in the form of an accumulator (600) configured with a first piston (605) inside a first piston sleeve (603) and a second piston (606) inside a second piston sleeve (604). The first and second piston sleeves (603, 604) are not rigidly connected together as per the embodiments of FIGS. 1-10, but are instead connected together via connector linkage (607) in the form of first and second con-rods (614, 615) (respectively attached to the first and second pistons (605, 606)) pivotally connected to a lever (616) at non-identical positions (617, 618) respectively.

The lever (616) is itself pivotal about a fulcrum (619) which is separated from the con-rod pivot connection (617, 618) by distances XX, YY respectively. It will be readily appreciated that by varying the relative lengths of XX and YY, the power ratio between the first and second pistons (605, 606) may be varied commensurately. FIG. 11a shows the fulcrum (619) positioned closer to the second piston (606) (i.e. XX>YY), while FIG. 11b shows the converse arrangement with the fulcrum (619) positioned closer to the first piston (605), i.e. XX<YY. The configuration shown in FIG. 11a would be applicable to a situation where it is desirable to retrieve very high pressure but less flow from the 'oil side', i.e., the second piston sleeve/second piston (604, 606) assembly. Conversely, FIG. 11 b illustrates the situation where it is desirable to retrieve high flow from the oil side but at less relative pressure and thus the fulcrum (619) is positioned closer to the first piston sleeve/first piston (603, 605) assembly. It will be readily appreciated by one skilled in the art that numerous alternative connector linkage arrangements may be utilised and as such fall within the scope of the invention.

Aspects of the present invention have been described by way of example only and it should be appreciated that modifications and additions may be made thereto without departing from the scope thereof.

The invention claimed is:

1. An apparatus including:
   an accumulator;
   a reciprocating component;
   a drive mechanism capable of moving the reciprocating component, said drive mechanism including a hydraulic drive motor;
   said accumulator including:
      an energy storage apparatus with a movable first piston face configured to reversibly compress an energy storage medium;
      a movable second piston face forming at least part of an inner surface of a corresponding second fluid chamber reversibly expandable by said second piston face;
      a movable third piston face forming at least part of an inner surface of a corresponding third fluid chamber reversibly expandable by said third piston face;
      said first, second and third piston faces being coupled together,
   wherein said apparatus further includes hydraulic fluid lines and hydraulic fluid interconnections, said hydraulic fluid lines including:
      at least one pressure line from a prime mover to;
         the drive motor;
         accumulator second fluid chamber;
         accumulator third fluid chamber;
      at least one drain line input to the prime mover from;
         the drive motor;
         accumulator second fluid chamber;
      at least one pressure line from the accumulator third fluid chamber to:
         the drive motor;
   the apparatus configured to concurrently;
      input hydraulic fluid to said second fluid chamber and output hydraulic fluid from the third fluid chamber to said hydraulic drive motor, during an expansion of said energy storage medium.

2. An apparatus as claimed in claim 1, wherein the second and third fluid chambers are located within a common piston sleeve and separated by a second piston having said second and third piston faces.

3. An apparatus as claimed in claim 1, wherein said piston faces include at least one of the group comprising:
movable sealing faces of pistons configured to slide within co-operating cylinder sleeves;
mountings for connecting an elastic medium to the second fluid chamber; and
mountings for connecting an elastic medium to the third fluid chamber.

4. An apparatus as claimed in claim 1, wherein said energy storage apparatus includes
a first fluid chamber reversibly expandable by said movable first piston face forming at least part of an inner surface of the first fluid chamber.

5. An apparatus as claimed in claim 4, wherein said first, second and third fluid chambers are coupled such that said first and third fluid chambers operate antagonistically and said first and second fluid chambers operate co-operatively.

6. An apparatus as claimed in claim 4, wherein the fluid chambers are coupled to include at least one of the group comprising:
an expansion of the first fluid chamber creates an expansion of the second fluid chamber and a contraction of the third-fluid chamber;
a contraction of the first fluid chamber creates a contraction of the second fluid chamber and an expansion of the third fluid chamber;
an expansion of the third fluid chamber creates a contraction of the first and second fluid chambers; and
an expansion of the second fluid chamber creates a contraction of the third fluid chamber and an expansion of the first fluid chamber.

7. An apparatus as claimed in claim 4, wherein said first, second and third piston faces are coupled such that;
expansion of said third fluid chamber by movement of said third piston face causes a contraction of said second fluid chamber and a contraction of said first fluid chamber, by movement of said second and first piston faces respectively, and
expansion of said first fluid chamber by movement of said first piston face causes an expansion of said second fluid chamber and a contraction of said third fluid chamber, by movement of said second and third piston faces respectively.

8. An apparatus as claimed in claim 4, wherein said first and second piston faces are connected together for common movement.

9. An apparatus as claimed in claim 8, wherein said first and second fluid chambers are:
substantially coaxial; or
have parallel central axes aligned substantially parallel with the direction of said common movement of the first and second piston faces.

10. An apparatus as claimed in claim 4, wherein said first fluid chamber is located within said second fluid chamber or said second fluid chamber is located within said first fluid chamber.

11. An apparatus as claimed in claim 4, wherein said first and second fluid chambers are concentric.

12. An apparatus as claimed in claim 4, formed with a double-ended piston assembly located within first and second piston sleeves and wherein:
said first piston and said second piston are movable within said first piston and second piston sleeves respectively, to form said first fluid chamber and third fluid chamber respectively,
said first piston and said second piston have piston faces within said first chamber and said third chamber, respectively defining said first piston and said third piston face,
said first piston and said second piston are coupled together by a connector and configured such that expansion or contraction of the first fluid chamber by movement of the first piston face on the first piston causes a reciprocal contraction or expansion of the third fluid chamber by movement of said third piston face of the second piston;
at least one intermediary partition separates said first piston sleeve and said second piston sleeve, said first piston and said second piston being respectively located in said first piston sleeve and said second piston sleeve and said intermediary partition allowing reversibly movable passage therethrough of said connector;
said second fluid chamber is formed from:
said intermediary partition,
a portion of an inner surface of said second piston sleeve and
said second piston face, formed on said second piston on an opposing side to said third piston face.

13. An apparatus as claimed in claim 12, including a signalling mechanism including a signal port incorporated into a fourth fluid chamber formed in the first piston sleeve between a movable fourth piston face located on the opposing side to said first piston face on said first piston and said intermediary partition surface spans said first piston sleeve.

14. An apparatus as claimed in claim 12, wherein the first and second pistons are coupled via a pivotal linkage configuration.

15. An apparatus as claimed in claim 12, including a signalling mechanism including a pressure sensor monitoring the pressure in the first fluid chamber.

16. An apparatus as claimed in claim 1, further including at least one of the group comprising: fluid conduits, valves and connections, configured to allow hydraulic fluid to be concurrently input to said third fluid chamber and output from the second fluid chamber.

17. An apparatus as claimed in claim 1, wherein reciprocation of said reciprocating component includes an operating cycle of the apparatus whereby during operation of the apparatus the reciprocating component repeatedly moves along a path, including at least one of: linear, non-linear, interrupted, orbital and irregular paths.

18. An apparatus as claimed in claim 1, wherein said energy storage medium includes an elastic medium, capable of moving said first piston face coupled to said elastic medium upon input or release of energy to the medium.

19. A powered drop hammer including:
an accumulator;
a reciprocating component;
a drive mechanism capable of moving the reciprocating component, said drive mechanism including a hydraulic drive motor;
said accumulator including:
an energy storage apparatus with a movable first piston face configured to reversibly compress an energy storage medium;

a movable second piston face forming at least part of an inner surface of a corresponding second fluid chamber reversibly expandable by said second piston face;

a movable third piston face forming at least part of an inner surface of a corresponding third fluid chamber reversibly expandable by said third piston face;

said first, second and third piston faces being coupled together;

wherein said apparatus further includes hydraulic fluid lines and hydraulic fluid interconnections, said hydraulic fluid lines including:

at least one pressure line from a prime mover to;
the drive motor;
accumulator second fluid chamber;
accumulator third fluid chamber;

at least one drain line input to the prime mover from;
the drive motor;
accumulator second fluid chamber;

at least one pressure line from the accumulator third fluid chamber to;
the drive motor;

configured to concurrently;
input hydraulic fluid to said second fluid chamber, and
output hydraulic fluid from the third fluid chamber to said hydraulic drive motor during an expansion of said energy storage medium;

said powered drop hammer further including:
a hammer weight with at least one drive-engagement surface;
a drive projection configured to engage with the drive-engagement surface, and
a drive mechanism capable of moving the drive projection reciprocally between two opposed directions.

20. A powered drop hammer as claimed in claim 19, wherein the drive mechanism includes a ram drive or an endless loop driven about at least two rotational members.

21. A powered drop hammer as claimed in claim 19, wherein the prime mover provides the source power for powering said drive mechanism.

22. A powered drop hammer as claimed in claim 21, wherein at least one drive projection is attached to the drive mechanism being formed from a rotating endless loop passing about two rotational members, at least one said rotational member being driven by the prime mover, providing high pressure hydraulic fluid flow to the drive motor in the drive mechanism.

23. A powered drop hammer as claimed in claim 19, wherein said drive mechanism further includes said hydraulic drive motor, converting pressurised hydraulic fluid flow into physical movement to operate the drive mechanism.

24. A method of operating a powered drop hammer including:

an accumulator;
a reciprocating component;
a drive mechanism capable of moving the reciprocating component, said drive mechanism including a hydraulic drive motor;

said accumulator including:
an energy storage apparatus with a movable first piston face configured to reversibly compress an energy storage medium;
a movable second piston face forming at least part of an inner surface of a corresponding second fluid chamber reversibly expandable by said second piston face;
a movable third piston face forming at least part of an inner surface of a corresponding third fluid chamber reversibly expandable by said third piston face;

said first, second and third piston faces being coupled together;

wherein said apparatus further includes hydraulic fluid lines and hydraulic fluid interconnections, said hydraulic fluid lines including:

at least one pressure line from a prime mover to;
the drive motor;
accumulator second fluid chamber;
accumulator third fluid chamber;

at least one drain line input to the prime mover from;
the drive motor;
accumulator second fluid chamber;

at least one pressure line from the accumulator third fluid chamber to;
the drive motor;

configured to concurrently;
input hydraulic fluid to said second fluid chamber and
output hydraulic fluid from the third fluid chamber to said hydraulic drive motor during an expansion of said energy storage medium,
said powered drop hammer further including
a hammer weight with at least one drive-engagement surface;
a drive projection configured to engage with either of the drive-engagement surfaces on the hammer weight, and
a drive mechanism capable of moving the drive projection reciprocally between two opposed directions, wherein in said method, said drive mechanism is cyclically operable through a cycle including the stages of an up stroke, upper stroke transition, down stroke and lower stroke transition, wherein during said:

up stroke, the drive projection engages with a said drive-engagement surface to raise the hammer weight upwards;

upper stroke transition, the hammer weight disengages from the drive projection as the hammer weight reaches its maximum extent of the up stroke and the hammer weight starts to travel downwards under the force of gravity;

down stroke, the drive projection re-engages with the hammer weight via another said drive-engagement surface as the hammer weight moves downwards, thereby adding additional impetus to the gravitational force driving downwards;

lower stroke transition, the drive projection detaches from the drive-engagement surface allowing the hammer weight to strike an impact surface.

25. The method of claim 24, wherein the accumulator is cyclically operable through the stages of a charging stroke and a power stroke performed contemporaneously with said up stroke and said down stroke stages respectively, whereby during said:

up stroke and charging stroke stage;
the accumulator is charged by high pressure fluid flow from the prime mover into the accumulator third fluid chamber, and
the hammer weight is lifted by activation of the drive motor by high pressure flow from the prime mover, upper stroke transition stage;
the hammer weight reaches an upwards travel limit and the drive mechanism either stops upwards movement or disengages from the hammer weight, down stroke and power stroke stage;
the accumulator discharges as the pressurised accumulator working gas moves said first piston face to expand the first fluid chamber, the third fluid chamber, coupled to said first fluid chamber therefore contracts, outputting hydraulic fluid at high pressure to the drive motor, high pressure hydraulic fluid from the prime mover is input to the second fluid chamber applying pressure on the second piston face, thereby causing the second fluid chamber to expand, as the second fluid chamber expands co-operatively with the first fluid chamber, force on the second piston face compounds with force on the first piston face to expel fluid from the third fluid chamber, lower stroke transition stage;

the hammer weight reaches limit of downwards travel and the drive mechanism either stops downwards travel or disengages from the hammer weight.

26. The method of claim 24, wherein during said lower stroke transition stage, hydraulic fluid from the drive motor is temporarily directed to the third fluid chamber, before hydraulic fluid output from the prime mover is directed to the drive motor.

* * * * *